(12) United States Patent
Aronson et al.

(10) Patent No.: US 7,058,310 B2
(45) Date of Patent: Jun. 6, 2006

(54) SYSTEM AND METHOD FOR PROTECTING EYE SAFETY DURING OPERATION OF A FIBER OPTIC TRANSCEIVER

(75) Inventors: Lewis B. Aronson, Los Altos, CA (US); Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 492 days.

(21) Appl. No.: 10/266,869

(22) Filed: Oct. 8, 2002

(65) Prior Publication Data

US 2003/0128411 A1    Jul. 10, 2003

Related U.S. Application Data

(63) Continuation-in-part of application No. 09/777,917, filed on Feb. 5, 2001.

(51) Int. Cl.
*H04B 10/00* (2006.01)

(52) U.S. Cl. .................................. 398/137; 398/139
(58) Field of Classification Search ................. 398/152, 398/135, 136, 137, 138, 139; 372/38.02; 257/80

See application file for complete search history.

(56) References Cited

U.S. PATENT DOCUMENTS

| | | | |
|---|---|---|---|
| 4,545,078 A | 10/1985 | Wiedeburg | 455/600 |
| 4,687,924 A | 8/1987 | Galvin et al. | 250/216 |
| 4,734,914 A | 3/1988 | Yoshikawa | 372/33 |
| 4,747,091 A | 5/1988 | Doi | 369/116 |

(Continued)

FOREIGN PATENT DOCUMENTS

| | | |
|---|---|---|
| EP | 02 70 4344 | 10/2004 |
| EP | 1471671 A2 | 12/2004 |
| JP | 58140175 | 8/1983 |
| JP | 62124576 | 11/1985 |

(Continued)

OTHER PUBLICATIONS

N.R. Avella, "AN/ARC–144 UHF Multimode Transceiver", SIGNAL, vol. 26, No. 5, (Jan./Feb. 1972) pp. 14–15.

(Continued)

*Primary Examiner*—Jason Chan
*Assistant Examiner*—Christina Y Leung
(74) *Attorney, Agent, or Firm*—Morgan, Lewis & Bockius LLP

(57) ABSTRACT

A single-chip integrated circuit, sometimes called a controller, controls operation of a transceiver having a laser transmitter and a photodiode receiver. The controller includes memory for storing information related to the transceiver, and analog to digital conversion circuitry for receiving a plurality of analog signals from the laser transmitter and photodiode receiver, converting the received analog signals into digital values, and storing the digital values in predefined locations within the memory. Comparison logic compares one or more of these digital values with predetermined setpoints, generates flag values based on the comparisons, and stores the flag values in predefined locations within the memory. Control circuitry in the controller shuts off the laser transmitter in response to comparisons of signals with predetermined setpoints that indicate potential eye safety hazards.

106 Claims, 8 Drawing Sheets

U.S. PATENT DOCUMENTS

| | | | |
|---|---|---|---|
| 5,019,769 A | 5/1991 | Levinson | 372/31 |
| 5,039,194 A | 8/1991 | Block et al. | 385/88 |
| 5,057,932 A | 10/1991 | Lang | 358/335 |
| 5,334,826 A | 8/1994 | Sato et al. | 235/455 |
| 5,383,208 A | 1/1995 | Queniat et al. | 372/29 |
| 5,392,273 A | 2/1995 | Masaki et al. | 369/106 |
| 5,396,059 A | 3/1995 | Yeates | 250/214 C |
| 5,448,629 A | 9/1995 | Bosch et al. | 359/187 |
| 5,510,924 A | 4/1996 | Terui et al. | 359/143 |
| 5,515,361 A | 5/1996 | Li et al. | 370/15 |
| 5,557,437 A | 9/1996 | Sakai et al. | 398/9 |
| 5,574,435 A | 11/1996 | Mochizuki | 340/630 |
| 5,594,748 A | 1/1997 | Jabr | 372/38 |
| 5,673,282 A | 9/1997 | Wurst | 372/38 |
| 5,812,572 A | 9/1998 | King et al. | 372/38 |
| 5,822,099 A | 10/1998 | Takamatsu | 398/162 |
| 5,926,303 A | 7/1999 | Giebel et al. | 359/163 |
| 5,943,152 A | 8/1999 | Mizrahi et al. | 359/187 |
| 5,953,690 A | 9/1999 | Lemon et al. | 702/191 |
| 5,956,168 A | 9/1999 | Levinson et al. | 398/41 |
| 6,010,538 A | 1/2000 | Sun et al. | 756/345 |
| 6,014,241 A | 1/2000 | Winter et al. | 359/245 |
| 6,020,593 A | 2/2000 | Chow et al. | 250/551 |
| 6,021,947 A | 2/2000 | Swartz | 235/472.01 |
| 6,023,147 A | 2/2000 | Cargin, Jr. et al. | 320/114 |
| 6,049,413 A | 4/2000 | Taylor et al. | 359/337 |
| 6,064,501 A | 5/2000 | Roberts et al. | 359/110 |
| 6,115,113 A | 9/2000 | Flockencier | 356/5.01 |
| H1881 H | 10/2000 | Davis et al. | 370/458 |
| 6,160,647 A | 12/2000 | Gilliland et al. | 398/23 |
| 6,175,434 B1 | 1/2001 | Feng | 359/152 |
| 6,423,963 B1 | 7/2002 | Wu | 250/227.14 |
| 6,473,224 B1 | 10/2002 | Dugan et al. | 359/341.44 |
| 6,512,617 B1 | 1/2003 | Tanji et al. | 398/137 |
| 2002/0027688 A1 | 3/2002 | Stephenson | 398/139 |
| 2002/0097468 A1 | 7/2002 | Mecherle et al. | 398/128 |
| 2002/0149821 A1 | 10/2002 | Aronson et al. | 398/135 |
| 2002/0181894 A1 | 12/2002 | Gilliland et al. | 385/88 |
| 2003/0053170 A1 | 3/2003 | Levinson et al. | 398/139 |
| 2003/0113118 A1 | 6/2003 | Bartur | 398/139 |
| 2004/0120720 A1 | 6/2004 | Chang et al. | 398/139 |
| 2004/0240886 A1 | 12/2004 | Aronson et al. | 398/135 |

FOREIGN PATENT DOCUMENTS

| | | |
|---|---|---|
| JP | 62235975 | 4/1986 |
| JP | 62281485 | 5/1986 |
| JP | 402102589 A | 4/1990 |
| JP | 404023373 A | 1/1992 |
| WO | WO 93/21706 | 10/1993 |
| WO | PCT/US02/03226 | 5/2002 |
| WO | WO 02/063800 A1 | 8/2002 |
| WO | PCT/US04/11130 | 10/2004 |
| WO | WO 2004/098100 | 11/2004 |

OTHER PUBLICATIONS

Hausdorf, Reiner, "Mobile Transceiver Measurements with Radiocommunication Service Monitor CMS", News From Rohde & Schwarz, 127, IV, 1989, pp. 4–7.

Mendez, J., "A Circuit to Provide Protection from Surge Voltages (for CB Transceiver)" Revista Española de Electronic, Mayo 1984, pp. 37–39.

Einwaechter and Fritz, "Shortwave Transmitter & Receiver System FuG 101 for Telegraphy and Telephony", Siemens Review XLII, No. 12, 1976, pp. 526–529.

SYSTEM AND METHOD FOR PROTECTING EYE SAFETY DURING OPERATION OF A FIBER OPTIC TRANSCEIVER

The present invention relates generally to the field of fiber optic transceivers and particularly to circuits used to monitor and control these transceivers. More specifically, the present invention is used to identify abnormal and potentially unsafe operating parameters and to report these to a host coupled to the fiber optic transceiver and/or perform laser shutdown, as appropriate.

BACKGROUND OF INVENTION

The two most basic electronic circuits within a fiber optic transceiver are the laser driver circuit, which accepts high speed digital data and electrically drives an LED or laser diode to create equivalent optical pulses, and the receiver circuit which takes relatively small signals from an optical detector and amplifies and limits them to create a uniform amplitude digital electronic output. In addition to, and sometimes in conjunction with these basic functions, there are a number of other tasks that must be handled by the transceiver circuitry as well as a number of tasks that may optionally be handled by the transceiver circuit to improve its functionality. These tasks include, but are not necessarily limited to, the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory is preferably accessible using a serial communication bus in accordance with an industry standard. The memory is used to store various information identifying the transceiver type, capability, serial number, and compatibility with various standards. While not standard, it would be desirable to further store in this memory additional information, such as sub-component revisions and factory test data.

Eye safety and general fault detection. These functions are used to identify abnormal and potentially unsafe operating parameters and to report these to the user and/or perform laser shutdown, as appropriate.

In addition, it would be desirable in many transceivers for the control circuitry to perform some or all of the following additional functions:

Temperature compensation functions. For example, compensating for known temperature variations in key laser characteristics such as slope efficiency.

Monitoring functions. Monitoring various parameters related to the transceiver operating characteristics and environment. Examples of parameters that it would be desirable to monitor include laser bias current, laser output power, received power level, supply voltage and temperature. Ideally, these parameters should be monitored and reported to, or made available to, a host device and thus to the user of the transceiver.

Power on time. It would be desirable for the transceiver's control circuitry to keep track of the total number of hours the transceiver has been in the power on state, and to report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. It would be desirable to enable a host device to be able to configure the transceiver so as to make it compatible with various requirements for the polarity and output types of digital inputs and outputs. For instance, digital inputs are used for transmitter disable and rate selection functions while digital outputs are used to indicate transmitter fault and loss of signal conditions.

Few if any of these additional functions are implemented in most transceivers, in part because of the cost of doing so. Some of these functions have been implemented using discrete circuitry, for example using a general purpose EEPROM for identification purposes, by inclusion of some functions within the laser driver or receiver circuitry (for example some degree of temperature compensation in a laser driver circuit) or with the use of a commercial microcontroller integrated circuit. However, to date there have not been any transceivers that provide a uniform device architecture that will support all of these functions, as well as additional functions not listed here, in a cost effective manner.

It is the purpose of the present invention to provide a general and flexible integrated circuit that accomplishes all (or any subset) of the above functionality using a straightforward memory mapped architecture and a simple serial communication mechanism.

FIG. 1 shows a schematic representation of the essential features of a typical prior-art fiber optic transceiver. The main circuit 1 contains at a minimum transmit and receiver circuit paths and power supply voltage 19 and ground connections 18. The receiver circuit typically consists of a Receiver Optical Subassembly (ROSA) 2 which contains a mechanical fiber receptacle as well as a photodiode and pre-amplifier (preamp) circuit. The ROSA is in turn connected to a post-amplifier (postamp) integrated circuit 4, the function of which is to generate a fixed output swing digital signal which is connected to outside circuitry via the RX+ and RX− pins 17. The postamp circuit also often provides a digital output signal known as Signal Detect or Loss of Signal indicating the presence or absence of suitably strong optical input. The Signal Detect output is provided as an output on pin 18. The transmit circuit will typically consist of a Transmitter Optical Subassembly (TOSA), 3 and a laser driver integrated circuit 5. The TOSA contains a mechanical fiber receptacle as well as a laser diode or LED. The laser driver circuit will typically provide AC drive and DC bias current to the laser. The signal inputs for the AC driver are obtained from the TX+ and TX− pins 12. Typically, the laser driver circuitry will require individual factory setup of certain parameters such as the bias current (or output power) level and AC modulation drive to the laser. Typically this is accomplished by adjusting variable resistors or placing factory selected resistors 7, 9 (i.e., having factory selected resistance values). Additionally, temperature compensation of the bias current and modulation is often required. This function can be integrated in the laser driver integrated circuit or accomplished through the use of external temperature sensitive elements such as thermistors 6, 8.

In addition to the most basic functions described above, some transceiver platform standards involve additional functionality. Examples of this are the external TX disable 13 and TX fault 14 pins described in the GBIC standard. In the GBIC standard, the external TX disable pin allows the transmitter to be shut off by the host device, while the TX fault pin is an indicator to the host device of some fault condition existing in the laser or associated laser driver circuit. In addition to this basic description, the GBIC standard includes a series of timing diagrams describing how these controls function and interact with each other to implement reset operations and other actions. Some of this functionality is aimed at preventing non-eyesafe emission levels when a fault conditions exists in the laser circuit. These functions may be integrated into the laser driver circuit itself or in an optional additional integrated circuit 11. Finally, the GBIC standard also requires the EEPROM 10 to store standardized serial ID information that can be read out via a serial interface (defined as using the serial interface of the ATMEL AT24C01A family of EEPROM products) consisting of a clock 15 and data 16 line.

Similar principles clearly apply to fiber optic transmitters or receivers that only implement half of the full transceiver functions.

In addition, optical energy emitted from fiber optic transceivers is potentially dangerous to the human eye. Of particular concern are lasers, because they emit monochromatic, coherent, and highly collimated light that concentrates energy into a narrow beam. It is the energy density of this narrow beam that can harm biological tissues, particularly the eye.

The severity of harm to biological tissues depends on the amount of energy, the exposure time, and the wavelength of the light, where the eye is more sensitive to lower wavelengths. Furthermore, seeing that most light used in fiberoptic systems is infrared energy that cannot be seen, a victim might be exposed to such infrared energy without noticing it.

Therefore, to address eye-safety concerns, laser-based products are regulated by standards. In the United States, responsibility for these regulations resides in the Center for Devices and Radiological Health (CDRH) of the Food and Drug Administration. Outside of the United States, the principle regulation is International Electrotechnical Commission (EEC) Publication 825. These regulations cover both the devices themselves and products using them.

The CDRH and IEC regulations define four classes of devices as follows:

Class I: These devices are considered inherently safe. The IEC requires a classification label, but the CDRH does not.

Class II: Class 2 lasers have levels similar to a Class I device for an exposure of 0.25 second. Eye protection is normally provided by what is called a "normal aversion response." This means that a victim usually responds to an exposure by an involuntary blink of the eye.

Class III: Both the CDRH and EEC define two subclasses: IIIa and IIIb. Class IIIa devices cannot injure a person's eye under normal conditions of bright light. They can, however, injure eyes when viewed through an optical aid such as a microscope or telescope. For Class IIIa, the CDRH concerns only visible light, while the IEC includes all wavelengths. Class IIIb devices can injure the eye if the light is viewed directly.

Class IV. These devices are more powerful than even Class IIIb lasers. They can injure the eye even when viewed indirectly.

The abovementioned regulations use equations to determine acceptable power levels at a given wavelength as well as procedures for making measurements or estimating power levels. Most lasers in fiber optics are either Class I or Class IIIb devices. Class I devices require no special precautions. Class IIIb devices, besides cautionary labels and warnings in the documentation, require that circuits be designed to lessen the likelihood of accidental exposure. For example, a safety interlock is provided so that the laser will not operate if exposure is possible.

One safety system is called open fiber control (OFC), which shuts down the laser if the circuit between the transmitter and receiver is open. A typical OFC system continuously monitors an optical link to ensure that the link is operating correctly by having the receiving circuit provide feedback to the transmitting circuit. If the receiving circuit does not receive data, the transmitting circuit stops operating the laser, under the assumption that a fault has occurred that might allow exposure to dangerous optical levels. This system, however, requires additional sensors and/or circuitry between the transmitter and the receiver. This is both costly and ineffective where the transmitter has not yet been coupled to a receiver.

In light of the above it is highly desirable to provide a system and method for identifying abnormal and potentially unsafe operating parameters of the fiber optic transceiver, to report these to the user, and/or perform laser shutdown, as appropriate.

SUMMARY OF THE INVENTION

The present invention is preferably implemented as a single-chip integrated circuit, sometimes called a controller, for controlling a transceiver having a laser transmitter and a photodiode receiver. The controller includes memory for storing information related to the transceiver, and analog to digital conversion circuitry for receiving a plurality of analog signals from the laser transmitter and photodiode receiver, converting the received analog signals into digital values, and storing the digital values in predefined locations within the memory. Comparison logic compares one or more of these digital values with predetermined setpoints, generates flag values based on the comparisons, and stores the flag values in predefined locations within the memory. Control circuitry in the controller controls the operation of the laser transmitter in accordance with one or more values stored in the memory. In particular, the control circuitry shuts off the laser transmitter in response to comparisons of signals with predetermined setpoints that indicate potential eye safety hazards.

A serial interface is provided to enable a host device to read from and write to locations within the memory. A plurality of the control functions and a plurality of the monitoring functions of the controller are exercised by a host computer by accessing corresponding memory mapped locations within the controller.

In some embodiments the controller further includes a cumulative clock for generating a time value corresponding to cumulative operation time of the transceiver, wherein the generated time value is readable via the serial interface.

In some embodiments the controller further includes a power supply voltage sensor that measures a power supply voltage supplied to the transceiver. In these embodiments the analog to digital conversion circuitry is configured to convert the power level signal into a digital power level value and to store the digital power level value in a predefined power level location within the memory. Further, the comparison logic of the controller may optionally include logic for comparing the digital power supply voltage with a voltage level limit value, generating a flag value based on the comparison of the digital power supply voltage with the power level limit value, and storing a power level flag value in a predefined power level flag location within the memory.

In some embodiments the controller further includes a temperature sensor that generates a temperature signal corresponding to a temperature of the transceiver. In these embodiments the analog to digital conversion circuitry is configured to convert the temperature signal into a digital temperature value and to store the digital temperature value in a predefined temperature location within the memory. Further, the comparison logic of the controller may optionally include logic for comparing the digital temperature value with a temperature limit value, generating a flag value based on the comparison of the digital temperature signal with the temperature limit value, and storing a temperature flag value in a predefined temperature flag location within the memory.

In some embodiments the controller further includes "margining" circuitry for adjusting one or more control signals generated by the control circuitry in accordance with an adjustment value stored in the memory.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DETAILED DESCRIPTION OF PREFERRED EMBODIMENTS

Figure 1:
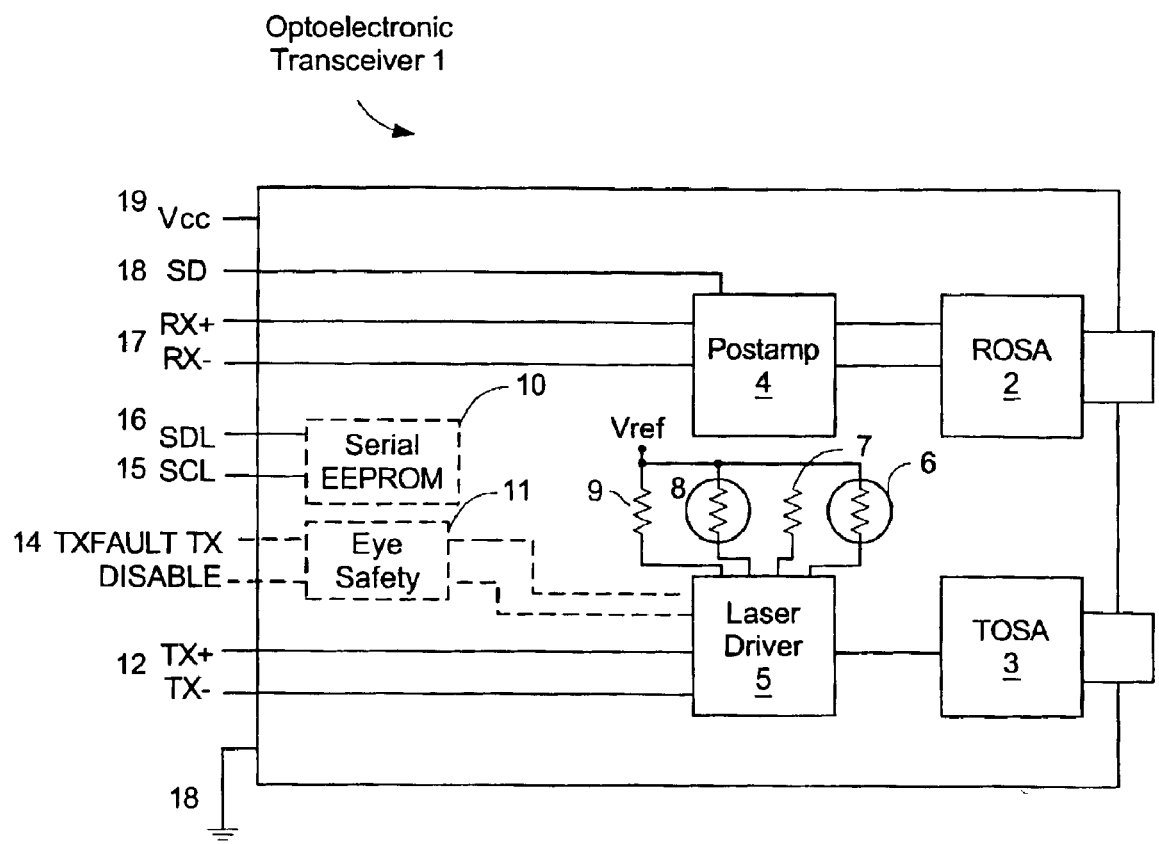
FIG. 1 is a block diagram of a prior art optoelectronic transceiver.
Figure 2:
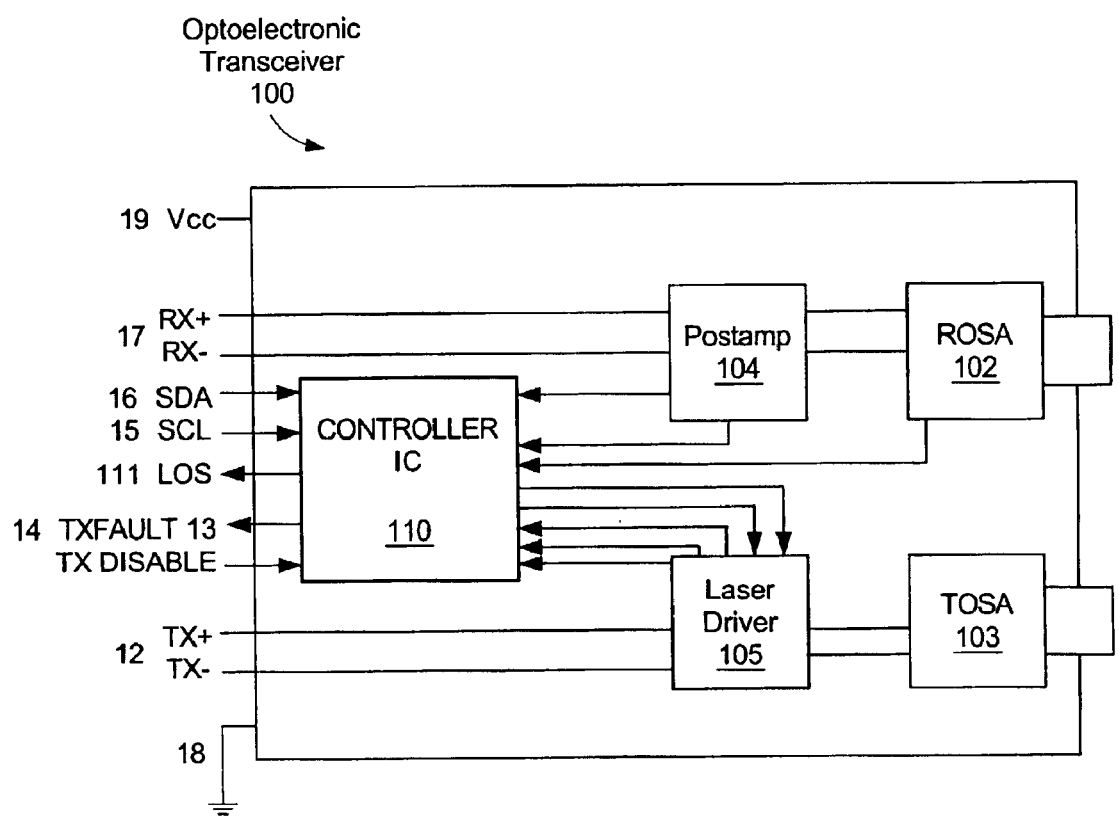
FIG. 2 is a block diagram of an optoelectronic transceiver in accordance with the present invention.
Figure 3:
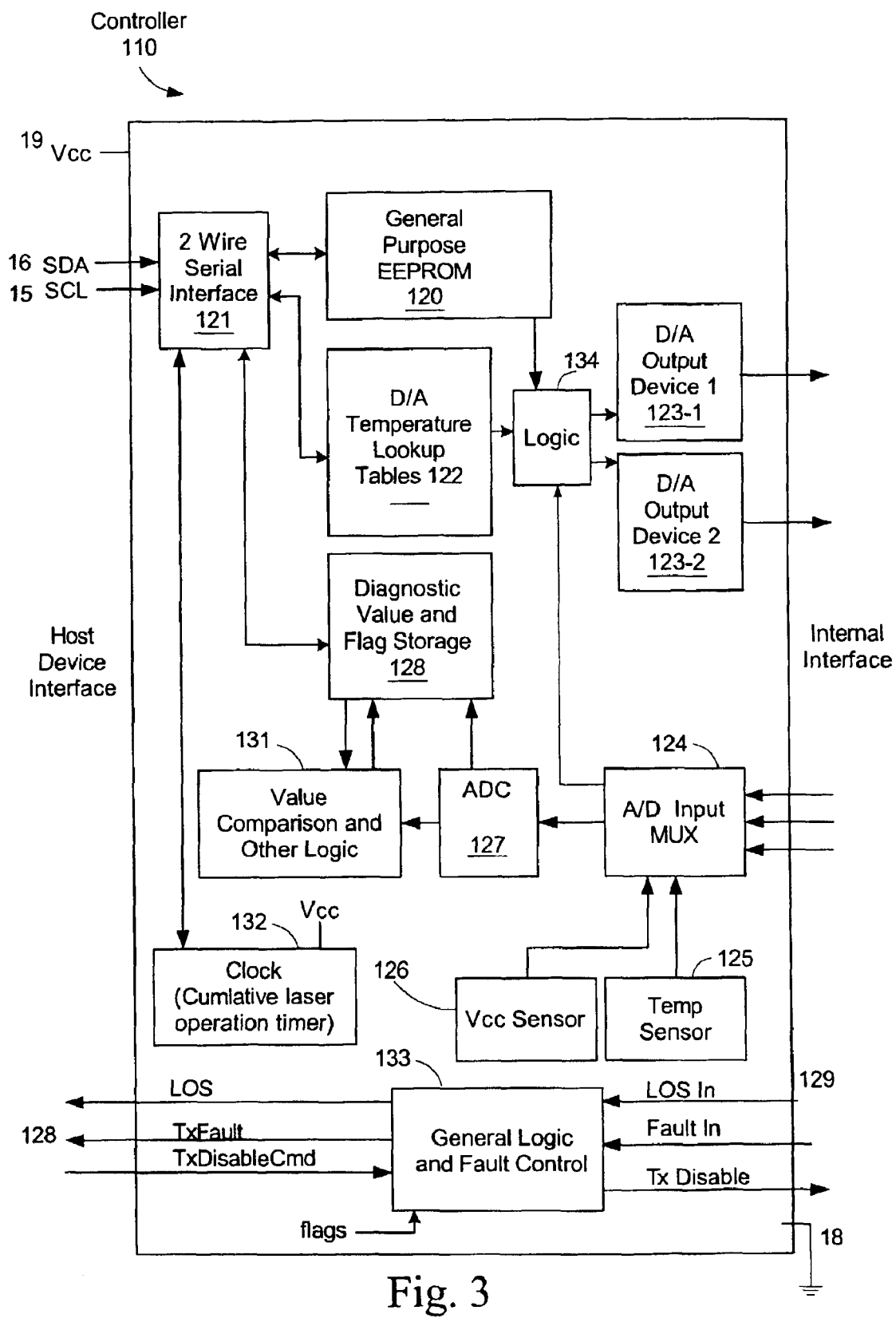
FIG. 3 is a block diagram of modules within the controller of the optoelectronic transceiver of FIG. 2.

A transceiver 100 based on the present invention is shown in FIGS. 2 and 3. The transceiver 100 contains a Receiver Optical Subassembly (ROSA) 102 and Transmitter Optical Subassembly (TOSA) 103 along with associated post-amplifier 104 and laser driver 105 integrated circuits that communicate the high speed electrical signals to the outside world. In this case, however, all other control and setup functions are implemented with a third single-chip integrated circuit 110 called the controller IC.

The controller IC 110 handles all low speed communications with the end user. These include the standardized pin functions such as Loss of Signal (LOS) 111, Transmitter Fault Indication (TX FAULT) 14, and the Transmitter Disable Input (TXDIS) 13. The controller IC 110 has a two wire serial interface 121, also called the memory interface, for accessing memory mapped locations in the controller. Memory Map Tables 1, 2, 3 and 4, below, are an exemplary memory map for one embodiment of a transceiver controller, as implemented in one embodiment of the present invention. It is noted that Memory Map Tables 1, 2, 3 and 4, in addition to showing a memory map of values and control features described in this document, also show a number of parameters and control mechanisms that are outside the scope of this document and thus are not part of the present invention.

The interface 121 is coupled to host device interface input/output lines, typically clock (SCL) and data (SDA) lines, 15 and 16. In the preferred embodiment, the serial interface 121 operates in accordance with the two wire serial interface standard that is also used in the GBIC and SFP standards, however other serial interfaces could equally well be used in alternate embodiments. The two wire serial interface 121 is used for all setup and querying of the controller IC 110, and enables access to the optoelectronic transceiver's control circuitry as a memory mapped device. That is, tables and parameters are set up by writing values to predefined memory locations of one or more nonvolatile memory devices 120, 122, 128 (e.g., EEPROM devices) in the controller, whereas diagnostic and other output and status values are output by reading predetermined memory locations of the same nonvolatile memory devices 120, 122, 128. This technique is consistent with currently defined serial ID functionality of many transceivers where a two wire serial interface is used to read out identification and capability data stored in EEPROM.

It is noted here that some of the memory locations in the memory devices 120, 122, 128 are dual ported, or even triple ported in some instances. That is, while these memory mapped locations can be read and in some cases written via the serial interface 121, they are also directly accessed by other circuitry in the controller 110. For instance, certain "margining" values stored in memory 120 are read and used directly by logic 134 to adjust (i.e., scale upwards or downwards) drive level signals being sent to the D/A output devices 123. Similarly, there are flags stored in memory 128 that are (A) written by logic circuit 131, and (B) read directly by logic circuit 133. An example of a memory mapped location not in memory devices but that is effectively dual ported is the output or result register of clock 132. In this case the accumulated time value in the register is readable via the serial interface 121, but is written by circuitry in the clock circuit 132.

In addition to the result register of the clock 132, other memory mapped locations in the controller may be implemented as registers at the input or output of respective sub-circuits of the controller. For instance, the margining values used to control the operation of logic 134 may be stored in registers in or near logic 134 instead of being stored within memory device 128. In another example, measurement values generated by the ADC 127 may be stored in registers. The memory interface 121 is configured to enable the memory interface to access each of these registers whenever the memory interface receives a command to access the data stored at the corresponding predefined memory mapped location. In such embodiments, "locations within the memory" include memory mapped registers throughout the controller.

In an alternate embodiment, the time value in the result register of the clock 132, or a value corresponding to that time value, is periodically stored in a memory location with the memory 128 (e.g., this may be done once per minute, or once per hour of device operation). In this alternate embodiment, the time value read by the host device via interface 121 is the last time value stored into the memory 128, as opposed to the current time value in the result register of the clock 132.

As shown in FIGS. 2 and 3, the controller IC 110 has connections to the laser driver 105 and receiver components. These connections serve multiple functions. The controller IC has a multiplicity of D/A converters 123. In the preferred embodiment the D/A converters are implemented as current sources, but in other embodiments the D/A converters may be implemented using voltage sources, and in yet other embodiments the D/A converters may be implemented using digital potentiometers. In the preferred embodiment, the output signals of the D/A converters are used to control key parameters of the laser driver circuit 105. In one embodiment, outputs of the D/A converters 123 are use to directly control the laser bias current as well as to control the level of AC modulation to the laser (constant bias operation). In another embodiment, the outputs of the D/A converters 123 of the controller 110 control the level of average output power of the laser driver 105 in addition to the AC modulation level (constant power operation).

In a preferred embodiment, the controller 110 includes mechanisms to compensate for temperature dependent characteristics of the laser. This is implemented in the controller 110 through the use of temperature lookup tables 122 that are used to assign values to the control outputs as a function of the temperature measured by a temperature sensor 125 within the controller IC 110. In alternate embodiments, the controller 110 may use D/A converters with voltage source outputs or may even replace one or more of the D/A converters 123 with digital potentiometers to control the characteristics of the laser driver 105. It should also be noted that while FIG. 2 refers to a system where the laser driver 105 is specifically designed to accept inputs from the controller 110, it is possible to use the controller IC 110 with many other laser driver ICs to control their output characteristics.

In addition to temperature dependent analog output controls, the controller IC may be equipped with a multiplicity of temperature independent (one memory set value) analog outputs. These temperature independent outputs serve numerous functions, but one particularly interesting application is as a fine adjustment to other settings of the laser driver 105 or postamp 104 in order to compensate for process induced variations in the characteristics of those devices. One example of this might be the output swing of the receiver postamp 104. Normally such a parameter would be fixed at design time to a desired value through the use of a set resistor. It often turns out, however, that normal process variations associated with the fabrication of the postamp integrated circuit 104 induce undesirable variations in the resulting output swing with a fixed set resistor. Using the present invention, an analog output of the controller IC 110, produced by an additional D/A converter 123, is used to adjust or compensate the output swing setting at manufacturing setup time on a part-by-part basis.

In addition to the connection from the controller to the laser driver 105, FIG. 2 shows a number of connections from the laser driver 105 to the controller IC 110, as well as similar connections from the ROSA 106 and Postamp 104 to the controller IC 110. These are analog monitoring connections that the controller IC 110 uses to provide diagnostic feedback to the host device via memory mapped locations in the controller IC. The controller IC 110 in the preferred embodiment has a multiplicity of analog inputs. The analog input signals indicate operating conditions of the transceiver and/or receiver circuitry. These analog signals are scanned by a multiplexer 124 and converted using an analog to digital converter (ADC) 127. The ADC 127 has 12 bit resolution in the preferred embodiment, although ADC's with other resolution levels may be used in other embodiments. The converted values are stored in predefined memory locations, for instance in the diagnostic value and flag storage device 128 shown in FIG. 3, and are accessible to the host device via memory reads. These values are calibrated to standard units (such as millivolts or microwatts) as part of a factory calibration procedure.

The digitized quantities stored in memory mapped locations within the controller IC include, but are not limited to, the laser bias current, transmitted laser power, and received power (as measured by the photodiode detector in the ROSA 102). In the memory map tables (e.g., Table 1), the measured laser bias current is denoted as parameter $B_{in}$, the measured transmitted laser power is denoted as $P_{in}$, and the measured received power is denoted as $R_{in}$. The memory map tables indicate the memory locations where, in an exemplary implementation, these measured values are stored, and also show where the corresponding limit values, flag values, and configuration values (e.g., for indicating the polarity of the flags) are stored.

As shown in FIG. 3, the controller 110 includes a voltage supply sensor 126. An analog voltage level signal generated by this sensor is converted to a digital voltage level signal by the ADC 127, and the digital voltage level signal is stored in memory 128. In a preferred embodiment, the A/D input multiplexer (mux) 124 and ADC 127 are controlled by a clock signal so as to automatically, periodically convert the monitored signals into digital signals, and to store those digital values in memory 128.

Furthermore, as the digital values are generated, the value comparison logic 131 of the controller compares these values to predefined limit values. The limit values are preferably stored in memory 128 at the factory, but the host device may overwrite the originally programmed limit values with new limit values. Each monitored signal is automatically compared with both a lower limit and upper limit value, resulting in the generation of two limit flag values that are then stored in the diagnostic value and flag storage device 128. For any monitored signals where there is no meaningful upper or lower limit, the corresponding limit value can be set to a value that will never cause the corresponding flag to be set.

The limit flags are also sometimes call alarm and warning flags. The host device (or end user) can monitor these flags to determine whether conditions exist that are likely to have caused a transceiver link to fail (alarm flags) or whether conditions exist which predict that a failure is likely to occur soon. Examples of such conditions might be a laser bias current which has fallen to zero, which is indicative of an immediate failure of the transmitter output, or a laser bias current in a constant power mode which exceeds its nominal value by more than 50%, which is an indication of a laser end-of-life condition. Thus, the automatically generated limit flags are useful because they provide a simple pass-fail decision on the transceiver functionality based on internally stored limit values.

In a preferred embodiment, fault control and logic circuit 133 logically OR's the alarm and warning flags, along with the internal LOS (loss of signal) input and Fault Input signals, to produce a binary Transceiver fault (TxFault)

signal that is coupled to the host interface, and thus made available to the host device. The host device can be programmed to monitor the TxFault signal, and to respond to an assertion of the TxFault signal by automatically reading all the alarm and warning flags in the transceiver, as well as the corresponding monitored signals, so as to determine the cause of the alarm or warning.

The fault control and logic circuit 133 furthermore conveys a loss of signal (LOS) signal received from the receiver circuit (ROSA, FIG. 2) to the host interface.

Yet another function of the fault control and logic circuit 133 is to determine the polarity of its input and output signals in accordance with a set of configuration flags stored in memory 128. For instance, the Loss of Signal (LOS) output of circuit 133 may be either a logic low or logic high signal, as determined by a corresponding configuration flag stored in memory 128.

Other configuration flags (see Table 4) stored in memory 128 are used to determine the polarity of each of the warning and alarm flags. Yet other configuration values stored in memory 128 are used to determine the scaling applied by the ADC 127 when converting each of the monitored analog signals into digital values.

In an alternate embodiment, another input to the controller 102, at the host interface, is a rate selection signal. In FIG. 3 the rate selection signal is input to logic 133. This host generated signal would typically be a digital signal that specifies the expected data rate of data to be received by the receiver (ROSA 102). For instance, the rate selection signal might have two values, representing high and low data rates (e.g., 2.5 Gb/s and 1.25 Gb/s). The controller responds to the rate selection signal by generating control signals to set the analog receiver circuitry to a bandwidth corresponding to the value specified by the rate selection signal.

Another function of the fault control and logic circuit 133 is to disable the operation of the transmitter (TOSA, FIG. 2) when needed to ensure eye safety. There is a standards defined interaction between the state of the laser driver and an internal Tx Disable output, which is implemented by the fault control and logic circuit 133. When the logic circuit 133 detects a problem that might result in an eye safety hazard, the laser driver is preferably disabled by activating an internal Tx Disable signal output from the controller, as described in further detail below. The host device can reset this condition by sending a command signal on the external Tx Disable line 13 (FIG. 2) into the controller from the host. Further details of this functionality can be found below in relation to FIGS. 4–7.

Figure 4:
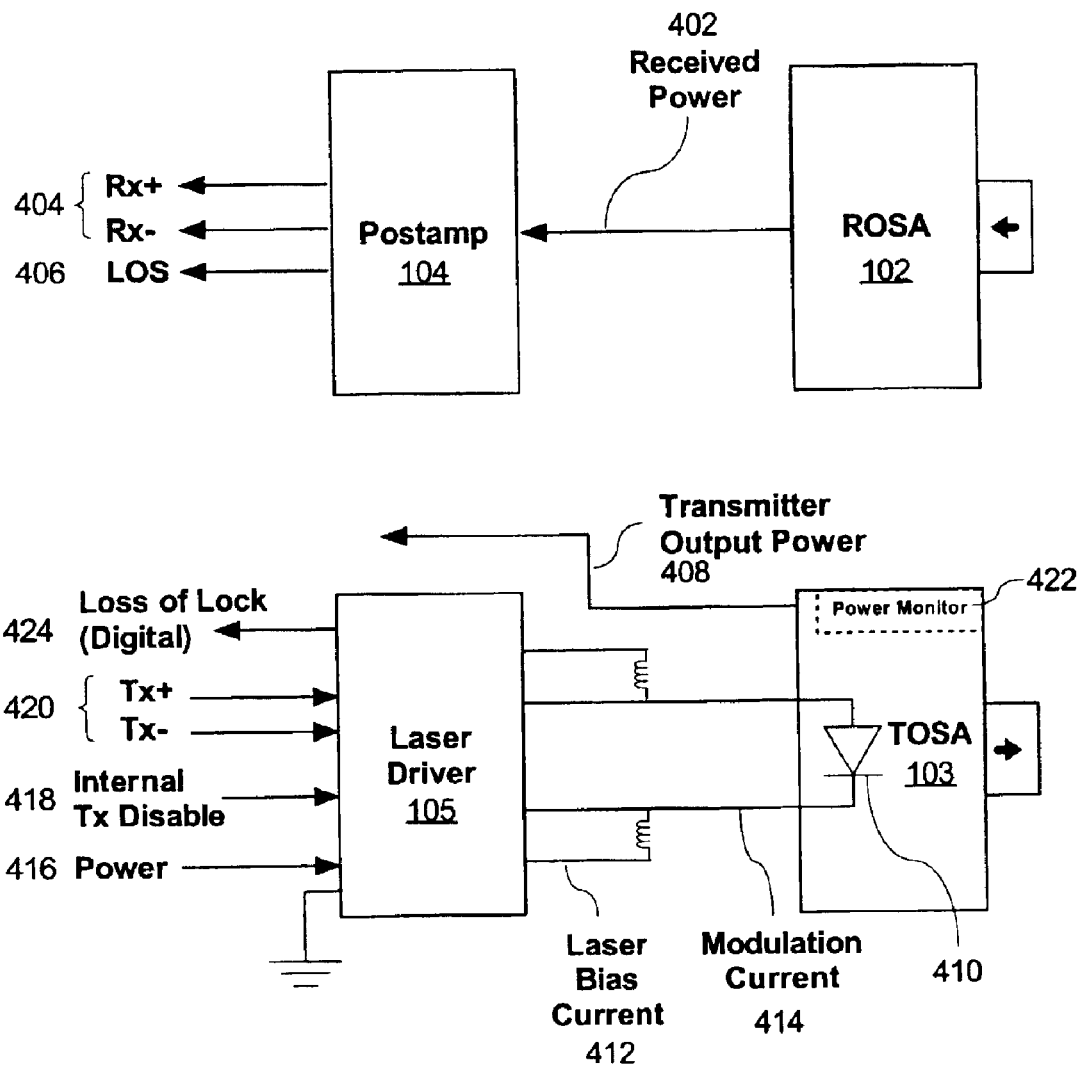
FIG. 4 is a more detailed block diagram of the connections between the controller and the laser driver and post-amplifier.

FIG. 4 is a more detailed block diagram of the connections between the controller 110 (FIG. 2) and the laser driver 105 and post-amplifier 104. Optical signals received by the optical receiver in the ROSA 102 are transmitted along a received power connection 402 to the postamp 104. The postamp 104 generates a fixed output swing digital signal which is connected to the host, and/or controller 110 (FIG. 2), via RX+ and RX− connections 404. The postamp circuit preferably also provides a Loss of Signal (LOS) indicator to the host, and/or controller 110 (FIG. 2), via a LOS connection 406, indicating the presence or absence of suitably strong optical input.

The host transmits signal inputs TX+ and TX− to the laser driver 105 via TX+ and TX− connections 420. In addition, the controller 110 (FIG. 2) transmits power to the laser driver via connection 416, and a transmitter disable signal to the laser driver 105 via an internal TX disable connection 418.

As a laser 410 within the TOSA is not turned on and off, but rather modulated between high and low levels above a threshold current, a modulation current is supplied to the laser 410 via an AC modulation current connection 414. Furthermore, a DC laser bias current is supplied from the laser driver 105 to the laser 410 via a laser bias current connection 412. The level of the laser bias current is adjusted to maintain proper laser output (i.e., to maintain a specified or predefined average level of optical output power by the TOSA 103) and to compensate for variations in temperature and power supply voltage.

In addition, some transceivers include an output power monitor 422 within the TOSA 103 that monitors the energy output from the laser 410. The output power monitor 422 is preferably a photodiode within the laser package that measures light emitted from the back facet of the laser 410. In general, the amount of optical power produced by the back facet of the laser diode, represented by an output power signal, is directly proportional to the optical power output by the front or main facet of the laser 410. The ratio, K, of the back facet optical power to the front facet optical power will vary from one laser diode to another, even among laser diodes of the same type. The output power signal is transmitted from the output power monitor 422 in the TOSA 103 to the controller 110 (FIG. 2) via a transmitter output power connection 408.

In a preferred embodiment, certain of the components within the fiber optic transceiver include monitoring logic that outputs digital fault conditions. For example, the laser driver 105 may output a "out of lock" signal 424 if a control loop monitoring the modulation current is broken. These digital fault condition outputs may then be used to notify the host of fault conditions within the component, or shut down the laser.

Figure 5A:
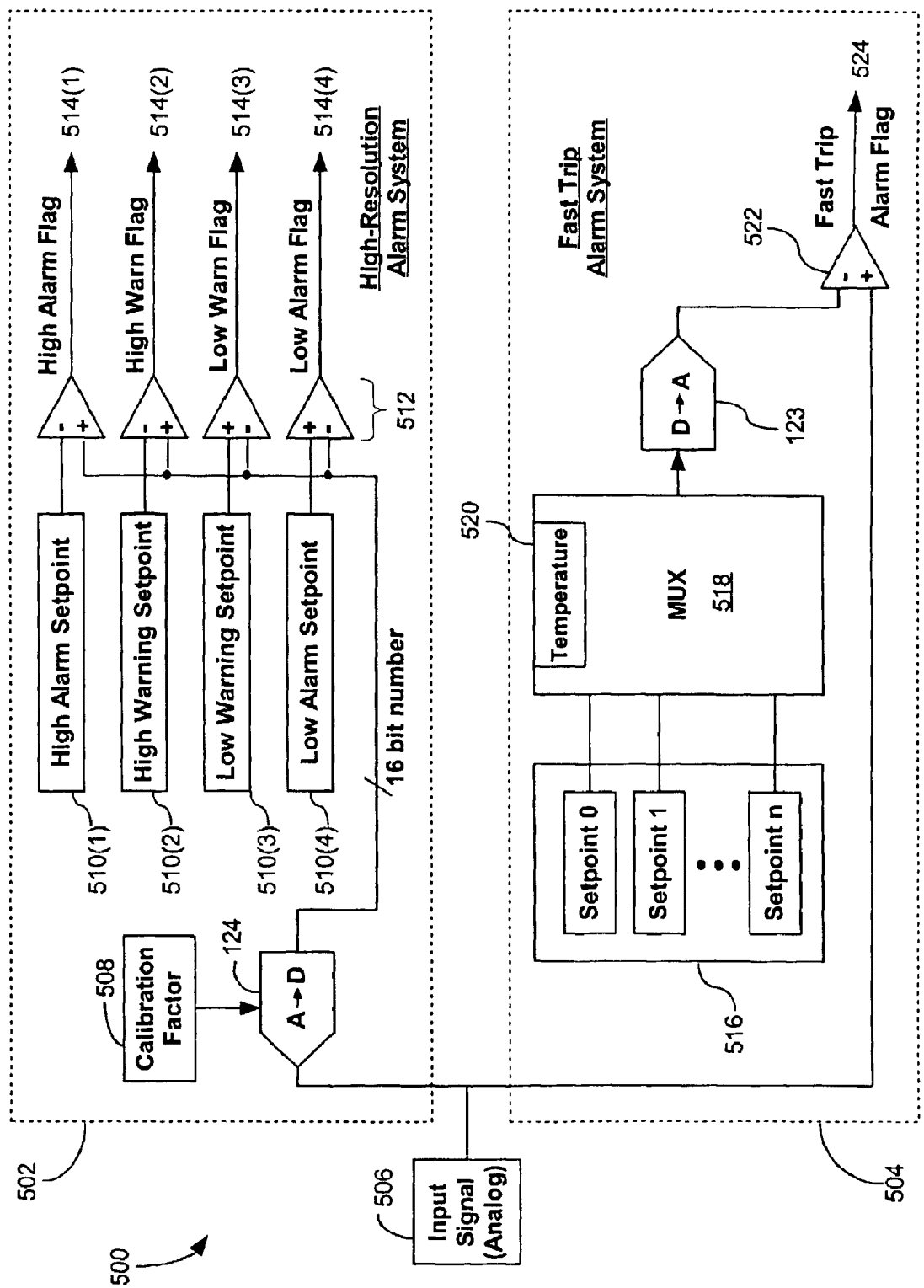
FIG. 5A is a block diagram of a high-resolution alarm system and a fast trip alarm system, for monitoring and controlling the operation of the fiber optic transceiver to ensure eye safety.

FIG. 5A is a block diagram 500 of a high-resolution alarm system 502 and a fast trip alarm system 504, for monitoring and controlling the operation of the fiber optic transceiver to ensure eye safety. The fast trip alarm system 504 is used to quickly generate flag used to shut down the laser 410 (FIG. 4). The fast trip alarm system 504 uses an analog comparator 522 to achieve a quick response. The high resolution alarm system 502 does not generate a flag to shut down the laser as quick as the fast trip alarm system 504. However, the high resolution alarm system 502 is more accurate than the fast trip alarm system 504. To achieve this accuracy, the high resolution alarm system 502 uses digital comparators 512. In use, the high resolution alarm system 502 and the fast trip alarm system 504 operate simultaneously. If the fast trip alarm system 504 does not generate a flag quickly, the high resolution alarm system 502 will identify the fault and generate a flag to shut down the laser.

The high-resolution alarm system 502 and fast trip alarm system 504 are preferably contained within the controller 110 (FIG. 3). Both the high-resolution alarm system 502 and fast trip alarm system 504 are coupled to an input signal 506. In a preferred embodiment this input signal is an analog signal. It should be noted that FIG. 5A shows the high-resolution alarm system 502 and fast trip alarm system 504 for a single input signal 506. However, in a preferred embodiment, identical alarm systems 502 and 504 are provided for each of several signals 506, including several different types of input signals.

The input signals processed by the alarm systems 502 and 504 preferably include: power supply voltage, internal transceiver temperature (hereinafter "temperature"), laser bias current, transmitter output power, and received optical power. The power supply voltage 19 (FIG. 3) is preferably the voltage in millivolts as measured by the Vcc sensor 126 (FIG. 3). The temperature is preferably the temperature in °C. as measured by the temperature sensor 125 (FIG. 3). The laser bias current is preferably the laser bias current in microamps supplied to the laser 410 (FIG. 4) via the laser bias current connection 412 (FIG. 4). The received optical power is the power in microwatts received at the ROSA 102 (FIG. 4) via the received power connection 402 (FIG. 4). Finally, the optical output power (FIG. 4) is the optical power output in microwatts, from the power monitor 422 (FIG. 4) as received by the controller 110 (FIG. 2) via the output power connection 408 (FIG. 4).

The high-resolution alarm system 502 preferably utilizes all of the above described input signals to trigger warnings and/or shut down at least part of the fiber optic transceiver. In other embodiments the high-resolution alarm system 502 utilizes a subset of the above described input signals to trigger warnings and/or alarms. The high-resolution alarm system 502 includes one or more analog to digital converters 124 (see also FIG. 3) that are configured to receive the analog input signal 506. Each type of analog input signal is preferably converted to a digital input signal using a calibration factor 508 for the particular type of input signal received. For example, a supply voltage in millivolts is converted to a 16 bit digital number by multiplying a supply voltage millivolt value by a supply voltage calibration factor. These calibration factors are predetermined and are preferably stored in the diagnostic value and flag storage 128 (FIG. 3). Alternatively, such calibration factors 508 may be stored in the general purpose EEPROM 120 (FIG. 3).

The analog to digital converter 124 is also coupled to multiple comparators 512. In a preferred embodiment, the comparators 512 form a portion of the value comparison and other logic 131 (FIG. 3) in the controller 110 (FIG. 2). In a preferred embodiment, these comparators 512 are digital comparators.

Also coupled to the comparators 512 are high-resolution setpoints 510(1)–(N). In a preferred embodiment, four predetermined setpoints 510(1)–(4) (for each type of input signal 506) are stored in the diagnostic value and flag storage 128 (FIG. 3). These four predetermined setpoints are: a high alarm setpoint 510(1), a high warning setpoint 510(2), a low warning setpoint 510(3), and a low alarm setpoint 510(4). The comparators 512(1)–(N) are configured to compare the input signal 506 with the predetermined setpoints 510(1)–(4). In a preferred embodiment, the digital equivalent of the input signal 506 is simultaneously compared by the comparators 512(1)–(N), to each of the four digital predetermined setpoints 510(1)–(N) for the particular type of input signal received. Also in a preferred embodiment, the setpoints 510(1)–(N) and the digital equivalents to the input signals 506 are preferably sixteen bit numbers. Of course, in other embodiments there may be more or fewer setpoints 510, and the setpoints 510 and input signal could be digitally represented by more or fewer than sixteen bits.

The comparators subsequently generate high-resolution flags 514(1)–(N), which are input into the general logic and fault control circuit 133 (FIG. 3) to either provide a warning to the host computer, or to shut down at least part of the fiber optic transceiver, such as the laser driver 105 (FIG. 4) and/or laser 410 (FIG. 4). Further details of the method for preventing potentially unsafe operation of the fiber optic transceiver, using the high-resolution alarm system 502, are described below in relation to FIG. 7.

The fast trip alarm system 504 includes multiple temperature dependant setpoints 516. These temperature dependant setpoints 516 are preferably stored in the diagnostic values flag storage 128 (FIG. 3) or the D/A temperature lookup tables 122 (FIG. 3). A multiplexer 518 is configured to supply one of the temperature dependant setpoints 516 to a digital to analog converter 123 (also shown in FIG. 3). The precise temperature dependant setpoint 516 that is supplied depends on the temperature 520 measured by the temperature sensor 125 (FIG. 3). For example, for a first measured temperature, a first setpoint is supplied by the multiplexer 518 to the digital to analog converter 123.

A separate copy or instance of the fast trip alarm system 504 is provided for each input signal 506 for which a temperature based alarm check is performed. Unlike the high-resolution alarm system 502, the fast trip alarm system 504 preferably utilizes only the following input signals 506: laser bias current, transmitter output power, and received optical power input signals, and thus in the preferred embodiment there are three instances of the fast trip alarm system 504. In other embodiment, fewer or more fast trip alarm systems 504 may be employed. The analog input signals processed by the fast trip alarm systems 504 are each fed to a respective comparator 522 that compares the input signal to an analog equivalent of one of the temperature dependant setpoints 516. In a preferred embodiment, the comparators 522 form a portion of the value comparison and other logic 131 (FIG. 3) in the controller 110 (FIG. 2). In a preferred embodiment, the comparators 522 are analog comparators.

In a preferred embodiment at least eight temperature dependant setpoints 516 are provided for the laser bias current input signal, with each setpoint corresponding to a distinct 16° C. temperature range. The size of the operating temperature range for each setpoint may be larger or smaller in other embodiments. These temperature dependant setpoints for the laser bias current are crucial because of the temperature compensation needs of a short wavelength module. In particular, at low temperatures the bias required to produce the required light output is much lower than at higher temperatures. In fact, a typical laser bias current when the fiber optic transceiver is at the high end of its temperature operating range will be two or three times as high as the laser bias current when fiber optic transceiver is at the low end of its temperature operating range, and thus the setpoints vary dramatically based on operating temperature. A typical temperature operating range of a fiber optic transceiver is about −40° C. to about 85° C. The temperature dependant setpoints for the laser bias current are also crucial because of the behavior of the laser bias circuit in a fiber optic transceiver that transmits long wavelength energy.

Also in a preferred embodiment, at least four temperature dependant setpoints 516 are provided for the received optical power and transceiver output power input signals, with each setpoint corresponding to a distinct 32° C. operating temperature range of the fiber optic transceiver. The size of the operating temperature range for each setpoint may be larger or smaller in other embodiments.

In a preferred embodiment, the above mentioned setpoints 516 are 8 bit numbers, which scale directly to the pin (Bin, Pin, Rin) input voltages at (2.5V(max)/256 counts)=0.0098 volts/count.

The comparator 522 is configured to compare an analog equivalent of one of the setpoints 516 to the analog input signal 506. In a preferred embodiment, if the analog input signal 506 is larger than the analog equivalent to one of the setpoints 516, then a fast trip alarm flag 524 is generated. The fast trip alarm flag 524 is input into the general logic and fault control circuit 133 (FIG. 3) to either provide a warning to the host computer or shut down at least part of the fiber optic transceiver, such as the laser driver 105 (FIG. 4) and/or laser 410 (FIG. 4). Further details of the method for preventing potentially unsafe operation of the fiber optic transceiver, using the fast trip alarm system 504, are described below in relation to FIG. 6.

Figure 5B:
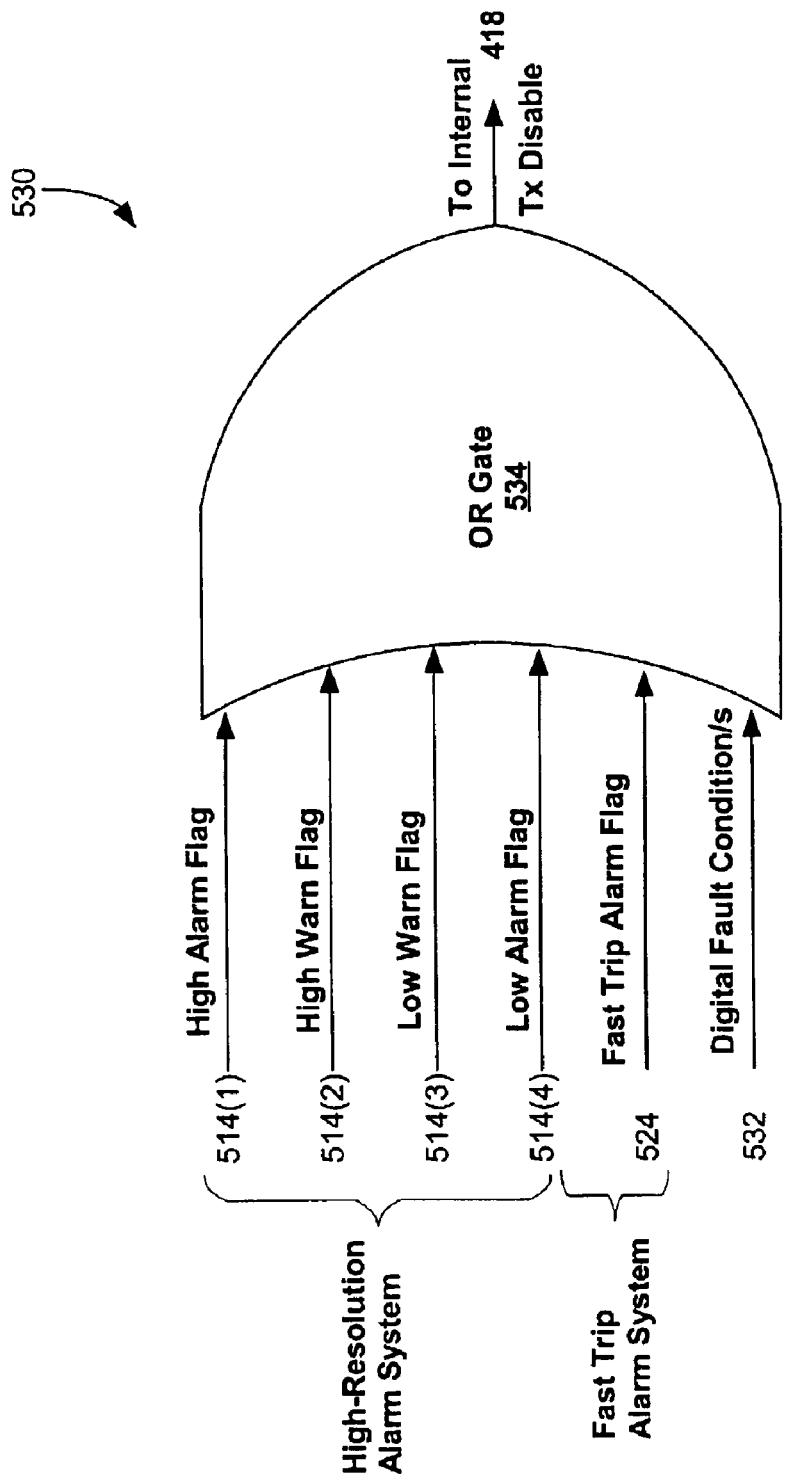
FIG. 5B is a block diagram of logic for disabling the operation of the fiber optic transceiver to ensure eye safety.

FIG. 5B is a block diagram of logic 530 for disabling the operation of the fiber optic transceiver to ensure eye safety, according to a preferred embodiment of the invention. The high-resolution alarm flags 514(1)–(4), the fast trip alarm system flag 524, and any digital fault condition 532 signals, from FIGS. 4 and 5A, are transmitted to an OR gate 534, which is used to shut down the laser. This is accomplished by sending a signal along the internal Tx disable line 418 (FIG. 4). For example if a digital "out of lock" signal or a fast trip alarm flag is received, the laser will be shut down. It should be appreciated that more or less alarm flags or digital fault condition signals may be supplied to the OR gate 534. For instance, in one preferred embodiment, the inputs to the OR gate 534 include only the high and low alarm flags 514(1), 514(4), the fast trip alarm flag 524 and the digital fault condition(s) signal 532. In other words, in this preferred embodiment, the warning flags 514(2) and 514(3) are not used to generate the internal Tx disable signal 418.

Figure 6:
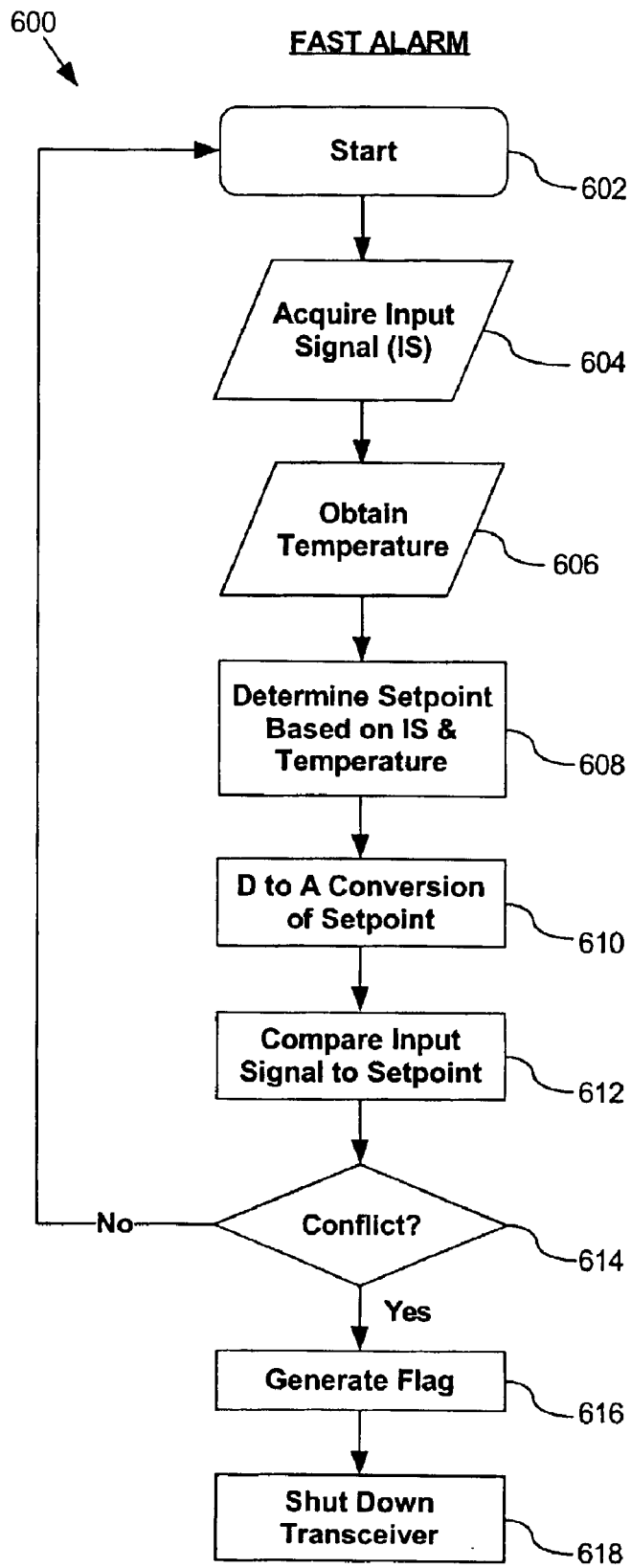
FIG. 6 is a flow chart of a method for reducing or preventing potentially unsafe operation of a fiber optic transceiver using the fast trip alarm system of FIG. 5A.

FIG. 6 is a flow chart of a method 600 for reducing or preventing potentially unsafe operation of a fiber optic transceiver using the fast trip alarm system 504 of FIG. 5A. Once the fast trip alarm system 504 (FIG. 5A) has started at step 602, an input signal is acquired, at step 604. In a preferred embodiment, the input signal is preferably an analog signal of: laser bias current in milliamps, received optical power in microwatts, or transceiver output power in microwatts. A temperature of the fiber optic transceiver is obtained at step 606. Step 606 may be performed before, after or at the same time as input signal acquisition step 604.

The multiplexer 518 (FIG. 5A) uses the input signal and the measured temperature to determine, at step 608, which setpoint 516 (FIG. 5A) to use for comparison with the input signal. For example, if the input signal is laser bias current, then the multiplexer looks up a setpoint for laser bias current based on the obtained temperature 520 (FIG. 5A).

In a preferred embodiment, this setpoint is then converted from a digital to analog value, at step 610 by the digital to analog converter 123 (FIG. 5A). Thereafter, the comparator 522 (FIG. 5A) compares the input signal to the setpoint, at step 612, to determine whether there is a conflict, at step 614. In a preferred embodiment, a conflict occurs where the input signal is higher than the setpoint (or an analog equivalent of the setpoint). Alternatively, a conflict may occur where the input signal is lower than the setpoint (or an analog equivalent of the setpoint).

If no conflict exists (614-No), then the method 600 repeats itself. However, if a conflict does exist (614-Yes), then a fast trip alarm flag 524 (FIG. 5A) is generated at step 616. In a preferred embodiment the fast trip alarm flag 524 (FIG. 5A) is then used to shut down at least part of the fiber optic transceiver, at step 618, by applying a signal to the internal TxDisable connection 418 (FIG. 4). In a preferred embodiment the fast trip alarm flag 524 (FIG. 5A) is used to disable the laser driver 105 (FIG. 4) and/or laser 410 (FIG. 4), so that no potential eye-damage can occur.

The alarm flag 524 (FIG. 5A) can be used to control the laser driver via the internal Tx Disable Output (Dout) and signal the fault to the host system via the Tx Fault Output (Fout). These outputs can also respond to the Tx Fault Input (Fin), if that signal exists in any given implementation, and the Tx Disable Input (Din) which comes into the fiber optic transceiver from the host.

Figure 7:
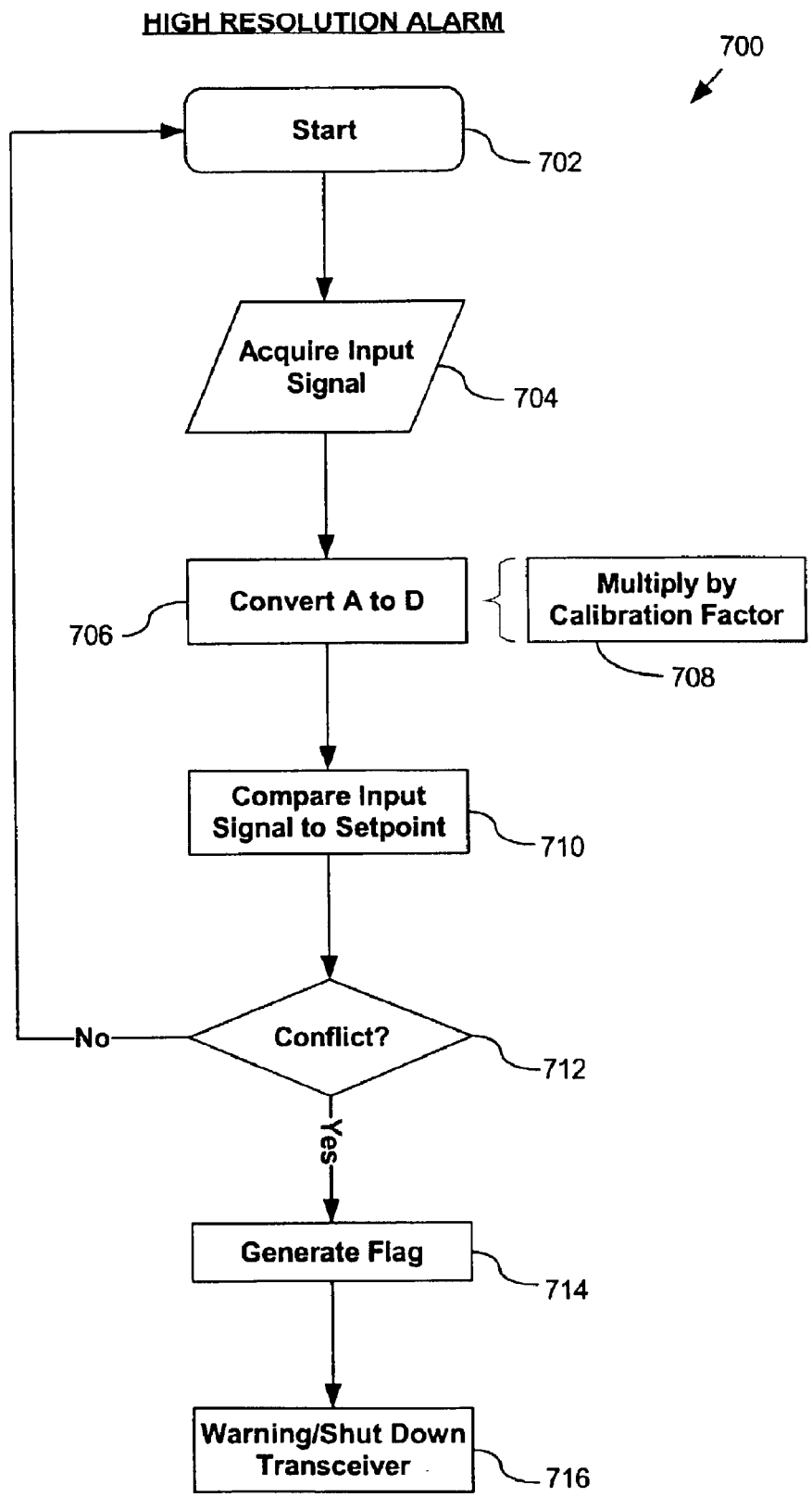
FIG. 7 is a flow chart of a method for reducing or preventing potentially unsafe operation of a fiber optic transceiver using the high-resolution alarm system of FIG. 5A.

FIG. 7 is a flow chart of a method 700 for reducing or preventing potentially unsafe operation of a fiber optic transceiver using the high-resolution alarm system 502 of FIG. 5A. Once the high-resolution alarm system 502 (FIG. 5A) has started at step 702, an input signal is acquired, at step 704. In a preferred embodiment, the input signal is preferably an analog signal of: power supply voltage 19 (FIG. 3) in millivolts; the temperature in °C.; the laser bias current 412 (FIG. 4) in microamps; the received optical power 420 (FIG. 4) in microwatts; and the output power 408 (FIG. 4) in microwatts. In other embodiments, the input signal(s) may be scaled in accordance with other units.

An analog to digital converter 124 (FIGS. 3 and 5) then converts the analog input signal 506 (FIG. 5A) to a digital equivalent, preferably a 16 bit number, at step 706. Conversion of the analog input signal 506 (FIG. 5A) to a digital equivalent performed includes multiplying the input signal 506 (FIG. 5A) by a calibration factor 508 (FIG. 5A), at step 708, for the particular type of input signal received, as described above in relation to FIG. 5A.

The comparators 512 (FIG. 5A) then compare the digital equivalent of the input signal to the setpoints 510(1)–(N) (FIG. 5A), at step 710, to determine whether there is a conflict. In a preferred embodiment, conflicts occur when the digital equivalent of the input signal is: higher than the high alarm setpoint 510(1) to produce a high-alarm flag 514(1) (FIG. 5A); higher than the high warning setpoint 510(2) (FIG. 5A) to produce a high warning flag 514(2) (FIG. 5A); lower than a low warning flag 510(3) (FIG. 5A) to produce a low warning flag 514(3) (FIG. 5A); or lower than a low alarm flag 510(4) (FIG. 5A) to produce a low alarm flag 514(4) (FIG. 5A). It should, however, be appreciated that other types of alarms or warnings may be set.

If no conflict exists (712-No), then the method 700 repeats itself. However, if a conflict does exist (714-Yes), then a high-resolution flag 514(1)–(N) (FIG. 5A) is generated, at step 714. In a preferred embodiment, the high-resolution flags 514(1)–(N) (FIG. 5A) are a high alarm flag 514(1), a high warning flag 514(2), a low warning flag 514(3), and a low alarm flag 514(4), as shown in FIG. 5A. Also in a preferred embodiment, the high alarm flag 514(1) (FIG. 5A) and the low alarm flag 514(4) are used to shut down at least part of the fiber optic transceiver, at step 716, by applying a signal to the internal TxDisable connection 418 (FIG. 4). The part of the fiber optic transceiver shut down preferably includes the laser driver 105 (FIG. 4) and/or the TOSA 103 (FIG. 4). The high and low warning flags 514(2) and 514(3) (FIG. 5A) preferably merely provide a warning to the host and do not shut down the laser driver 105 (FIG. 4) and/or the TOSA 103 (FIG. 4).

The alarm flags 514(1)–(N) (FIG. 5A) can be used to control the laser driver via the internal Tx Disable Output (Dout) and signal the fault to the host system via the Tx Fault Output (Fout). These outputs can also respond to the Tx Fault Input (Fin), if that signal exists in any given implementation, and the Tx Disable Input (Din) which comes into the fiber optic transceiver from the host.

In a preferred embodiment, the high-resolution alarm system 502 (FIG. 5A) updates the high-resolution alarm flags at a rate of approximately once every 0.015 seconds (15 milliseconds), and more generally at least 50 times per second. Thus, the high-resolution alarm flags are set within 0.015 seconds of the detection of an alarm condition. In some embodiments the high-resolution alarm flag update rate is between about 50 times per second and 200 times per second. However, the fast trip alarm system 504 (FIG. 5A) preferably updates the fast trip alarm flags a rate that is faster than once every 10 microseconds. In some embodiments the fast trip alarm system 504 updates the fast trip alarm flags at a rate that is between 50,000 and 200,000 times per second, and more generally at least 50,000 times per second. In a preferred embodiment, the alarm flags of the fast trip alarm system 504 are updated at a rate that is more than a thousand times faster than the update rate of the high-resolution alarm flags. In other embodiments the alarm flags of the fast trip alarm system 504 are updated at a rate that is between 250 and 4000 times faster than the update rate of the high-resolution alarm flags.

To further aid the above explanation, two examples are presented below, where a single point failure causes an eye safety fault condition that is detected, reported to a host coupled to the fiber optic transceiver, and/or a laser shutdown is performed.

EXAMPLE 1

The power monitor 422 (FIG. 4) in a fiber optic transceiver that includes a power monitor, or its associated circuitry, fails, indicating no or low output power when the laser is in fact operating. The laser bias driver will attempt to increase the transmitter output power by increasing laser bias current. Since the feedback is interrupted, the laser is driven to its maximum capability, perhaps exceeding the eye safety alarm setpoints. The fast trip alarm flag will be generated in less than 10 microseconds after the failure and this fast trip alarm flag can be used to shut down the laser driver via the internal Tx disable (Dout) output. If the fast trip alarm fails or is not selected in the output logic setup, the high-resolution alarm for laser bias current is generated, and the high-resolution low alarm for power would also occur, either of which could be used to shut down the laser driver and/or TOSA.

EXAMPLE 2

The laser driver (in all types of fiber optic transceiver), or its associated circuitry fails, driving the laser to its maximum output. Depending on the specific failure, the laser bias current may read zero or very high, and in a fiber optic transceiver that includes a power monitor, the power will read very high. The fast trip alarm for laser bias current, and the fast trip alarm for transmitted output power will generate an alarm flag within 10 microseconds. If the laser bias current is reading zero, the high-resolution low alarm for laser bias current will generate an alarm flag. This may be indistinguishable from a failure that causes zero light output, like an open laser wire or shorted laser, but the alarm systems preferably err on the side of safety and command the laser to shut down. In this condition, it may not be possible for the logic to physically turn the laser off, if, for example, the fault was caused by a shorted bias driver transistor. In any case, the link will be lost and the Tx fault output will be asserted to advise the host system of the failure. Depending on the configuration of the bias driver circuit, there are non-error conditions which could set some of these flags during a host-commanded transmit disable state, or during startup conditions. For example, if the host commands a transmitter shutdown, some circuits might read zero transmit power, as one would expect, and some might read very large transmit power as an artifact of the shutdown mechanism. When the laser is re-enabled, it takes a period of time for the control circuitry to stabilize, and during this time there may be erratic occurrences of both low, high and fast trip alarms. Programmable delay timers are preferably used to suppress the fault conditions during this time period.

While the combination of all of the above functions is desired in the preferred embodiment of this transceiver controller, it should be obvious to one skilled in the art that a device which only implements a subset of these functions would also be of great use. Similarly, the present invention is also applicable to transmitters and receivers, and thus is not solely applicable to transceivers. Finally, it should be pointed out that the controller of the present invention is suitable for application in multichannel optical links.

TABLE 1

MEMORY MAP FOR TRANSCEIVER CONTROLLER

| | Name of Location | Function |
|---|---|---|
| Memory Location (Array 0) | | |
| 00h–5Fh | IEEE Data | This memory block is used to store required GBIC data |
| 60h | Temperature MSB | This byte contains the MSB of the 15-bit 2's complement temperature output from the temperature sensor. |
| 61h | Temperature LSB | This byte contains the LSB of the 15-bit 2's complement temperature output from the temperature sensor. (LSB is 0b). |
| 62h–63h | $V_{cc}$ Value | These bytes contain the MSB (62h) and the LSB (63h) of the measured $V_{cc}$ (15-bit number, with a 0b LSbit) |
| 64h–65h | $B_{in}$ Value | These bytes contain the MSB (64h) and the LSB (65h) of the measured $B_{in}$ (15-bit number, with a 0b LSbit) |
| 66h–67h | $P_{in}$ Value | These bytes contain the MSB (66h) and the LSB (67h) of the measured $P_{in}$ (15-bit number, with a 0b LSbit) |

TABLE 1-continued

MEMORY MAP FOR TRANSCEIVER CONTROLLER

| | Name of Location | Function |
|---|---|---|
| 68h–69h | $R_{in}$ Value | These bytes contain the MSB (68h) and the LSB (69h) of the measured $R_{in}$ (15-bit number, with a 0b LSbit) |
| 6Ah–6Dh | Reserved | Reserved |
| 6Eh | IO States | This byte shows the logical value of the I/O pins. |
| 6Fh | A/D Updated | Allows the user to verify if an update from the A/D has occurred to the 5 values: temperature, Vcc, $B_{in}$, $P_{in}$ and $R_{in}$. The user writes the byte to 00h. Once a conversion is complete for a give value, its bit will change to '1'. |
| 70h–73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0b. |
| 74h–77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0b. |
| 78h–7Ah | Reserved | Reserved |
| 7Bh–7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for reading and writing. 0xh (Array x Selected) Where x = 1, 2, 3, 4 or 5 |
| 80h–F7h | | Customer EEPROM |
| 87h Memory Location (Array 1) | DA % Adj | Scale output of D/A converters by specified percentage |
| 00h–FFh Memory Location (Array 2) | | Data EEPROM |
| 00h–Ffh Memory Location (Array 3) | | Data EEPROM |
| 80h–81h 88h–89h 90h–91h 98h–99h A0h–A1h | Temperature High Alarm Vcc High Alarm $B_{in}$ High Alarm $P_{in}$ High Alarm $R_{in}$ High Alarm | The value written to this location serves as the high alarm limit. Data format is the same as the corresponding value (temperature, Vcc, $B_{in}$, $P_{in}$, $R_{in}$). |
| 82h–83h 8Ah–8Bh 92h–93h 9Ah–9Bh A2h–A3h | Temperature Low Alarm Vcc Low Alarm $B_{in}$ Low Alarm $P_{in}$ Low Alarm $R_{in}$ Low Alarm | The value written to this location serves as the low alarm limit. Data format is the same as the corresponding value (temperature, Vcc, $B_{in}$, $P_{in}$, $R_{in}$). |
| 84h–85h 8Ch–8Dh 94h–95h 9Ch–9Dh A4h–A5h | Temp High Warning Vcc High Warning $B_{in}$ High Warning $P_{in}$ High Warning $R_{in}$ High Warning | The value written to this location serves as the high warning limit. Data format is the same as the corresponding value (temperature, Vcc, $B_{in}$, $P_{in}$, $R_{in}$). |
| 86h–87h 8Eh–8Fh | Temperature Low Warning | The value written to this location serves as the low warning limit. Data format is the |

TABLE 1-continued

MEMORY MAP FOR TRANSCEIVER CONTROLLER

| | Name of Location | Function |
|---|---|---|
| 96h–97h | Vcc Low Warning | same as the corresponding value |
| 9Eh–9Fh | $B_{in}$ Low Warning | (temperature, Vcc, $B_{in}$, $P_{in}$, $R_{in}$). |
| A6h–A7h | $P_{in}$ Low Warning | |
| | $R_{in}$ Low Warning | |
| A8h–AFh, | $D_{out}$ control 0–8 | Individual bit locations are defined in Table |
| C5h | $F_{out}$ control 0–8 | 4. |
| B0h–B7h, C6h | $L_{out}$ control 0–8 | |
| B8h–BFh, C7h | | |
| C0h | Reserved | Reserved |
| C1h | Prescale | Selects MCLK divisor for X-delay CLKS. |
| C2h | $D_{out}$ Delay | Selects number of prescale clocks |
| C3h | $F_{out}$ Delay | |
| C4h | $L_{out}$ Delay | |
| C8h–C9h | Vcc—A/D Scale | 16 bits of gain adjustment for corresponding |
| CAh–CBh | $B_{in}$—A/D Scale | A/D conversion values. |
| CCh–CDh | $P_{in}$—A/D Scale | |
| CEh–CFh | $R_{in}$—A/D Scale | |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h–D6h | PW1 Byte 3 (D3h) MSB | The four bytes are used for password 1 |
| | PW1 Byte 2 (D4h) | entry. The entered password will determine |
| | PW1 Byte 1 (D5h) | the Finisar customer's read/write privileges. |
| | PW1 Byte 0 (D6h) LSB | |
| D7h | D/A Control | This byte determines if the D/A outputs source or sink current, and it allows for the outputs to be scaled. |
| D8h–DFh | $B_{in}$ Fast Trip | These bytes define the fast trip comparison over temperature. |
| E0h–E3h | $P_{in}$ Fast Trip | These bytes define the fast trip comparison over temperature. |
| E4h–E7h | $R_{in}$ Fast Trip | These bytes define the fast trip comparison over temperature. |
| E8h | Configuration Override Byte | Location of the bits is defined in Table 4 |
| E9h | Reserved | Reserved |
| EAh–EBh | Internal State Bytes | Location of the bits is defined in Table 4 |
| ECh | I/O States 1 | Location of the bits is defined in Table 4 |
| EDh–EEh | D/A Out | Magnitude of the temperature compensated D/A outputs |
| EFh | Temperature Index | Address pointer to the look-up Arrays |
| F0h–FFh | Reserved | Reserved |
| Memory Location (Array 4) | | |
| 00h–Ffh | | D/A Current vs. Temp #1 (User-Defined Look-up Array #1) |
| Memory Location (Array 5) | | |
| 00h–Ffh | | D/A Current vs. Temp #2 (User-Defined Look-up Array #2) |

TABLE 2

DETAIL MEMORY DESCRIPTIONS - A/D VALUES AND STATUS BITS

| Byte | Bit | Name | Description |
|---|---|---|---|
| Converted analog values. Calibrated 16 bit data. (See Notes 1–2) | | | |
| 96 (60h) | All | Temperature MSB | Signed 2's complement integer temperature (−40 to +125 C.) Based on internal temperature measurement |
| 97 | All | Temperature LSB | Fractional part of temperature (count/256) |
| 98 | All | Vcc MSB | Internally measured supply voltage in transceiver. Actual voltage is full 16 bit value * 100 uVolt. |
| 99 | All | Vcc LSB | (Yields range of 0–6.55 V) |

TABLE 2-continued

DETAIL MEMORY DESCRIPTIONS - A/D VALUES AND STATUS BITS

| Byte | Bit | Name | Description |
|---|---|---|---|
| 100 | All | TX Bias MSB | Measured TX Bias Current in mA Bias current is full 16 bit value *(1/256) mA. |
| 101 | All | TX Bias LSB | (Full range of 0–256 mA possible with 4 uA resolution) |
| 102 | All | TX Power MSB | Measured TX output power in mW. Output is full 16 bit value *(1/2048) mW. (see note 5) |
| 103 | All | TX Power LSB | (Full range of 0–32 mW possible with 0.5 μW resolution, or −33 to +15 dBm) |
| 104 | All | RX Power MSB | Measured RX input power in mW RX power is full 16 bit value *(1/16384) mW. (see note 6) |
| 105 | All | RX Power LSB | (Full range of 0–4 mW possible with 0.06 μW resolution, or −42 to +6 dBm) |
| 106 | All | Reserved MSB | Reserved for 1st future definition of digitized analog input |
| 107 | All | Reserved LSB | Reserved for 1st future definition of digitized analog input |
| 108 | All | Reserved MSB | Reserved for 2nd future definition of digitized analog input |
| 109 | All | Reserved LSB | Reserved for 2nd future definition of digitized analog input |
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | Vcc A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |
| 111 | 1 | Reserved | Indicates A/D value in Bytes 108/109 is valid |
| 111 | 0 | Reserved | Reserved |

TABLE 3

DETAIL MEMORY DESCRIPTIONS - ALARM AND WARNING FLAG BITS
Alarm and Warning Flag Bits

| Byte | Bit | Name | Description |
|---|---|---|---|
| 112 | 7 | Temp High Alarm | Set when internal temperature exceeds high alarm level. |
| 112 | 6 | Temp Low Alarm | Set when internal temperature is below low alarm level. |
| 112 | 5 | Vcc High Alarm | Set when internal supply voltage exceeds high alarm level. |
| 112 | 4 | Vcc Low Alarm | Set when internal supply voltage is below low alarm level. |
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5–0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | Vcc High Warning | Set when internal supply voltage exceeds high warning level. |
| 116 | 4 | Vcc Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |
| 118 | All | Reserved | |
| 119 | All | Reserved | |

TABLE 4

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cnt10 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | P ft hi set | R ft hi set | D-in inv set | D-in set | F-in inv set |
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in inv clr |
| X-out cntl7 | D-in clr | F-in inv clr | F-in clr | L-in inv clr | L-in clr | Aux inv clr | Aux clr | EE |
| X-out cntl8 | latch select | invert | o-ride data select | o-ride data | S reset | HI enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | $B^3$ | $B^2$ | $B^1$ | $B^0$ |
| chip address | $b^7$ | $b^6$ | $b^5$ | $b^4$ | $b^3$ | $b^2$ | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |
| D/A cntl | source/sink 1/0 | | D/A #2 range $2^1$ | $2^0$ | source/sink 1/0 | $2^2$ | D/A #1 range $2^1$ | $2^0$ |
| | | $2^2$ | | | | | | |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale 2 | Pos_Scale 1 | Pos_Scale 0 |
| Margin #2 | Reserved | Neg_Scale2 | Neg_Scale1 | Neg_Scale0 | Reserved | Pos_Scale 2 | Pos_Scale 1 | Pos_Scale 0. |

What is claimed is:

1. A method for preventing potentially unsafe operation of a fiber optic transceiver, comprising:
   storing a digital equivalent of a predetermined setpoint in a memory within a fiber optic transceiver;
   acquiring, at an integrated circuit within said fiber optic transceiver, an input signal associated with operation of said fiber optic transceiver;
   comparing said input signal to said predetermined setpoint;
   determining that said input signal conflicts with said setpoint;
   generating an alarm flag based on said conflict;
   storing the alarm flag at a predefined location within the memory; and
   enabling a host to read from and write to host-specified locations within the memory, including the predefined location storing the alarm flag.

2. The method of claim 1, including repeating at least said input signal acquiring, comparing and conflict determining at least 50 times per second.

3. The method of claim 1, further comprising shutting down at least part of said fiber optic transceiver based on said alarm flag.

4. The method of claim 3, wherein shutting down includes disabling at least part of the fiber optic transceiver by a software operation.

5. The method of claim 3, wherein shutting down includes disabling at least part of the fiber optic transceiver by a signal sent to a disable pin in the fiber optic transceiver.

6. The method of claim 1, further comprising transmitting a warning to a host based on said alarm flag.

7. The method of claim 1, further comprising, before said comparing:
   obtaining a temperature of said fiber optic transceiver; and
   ascertaining said predetermined setpoint from multiple setpoints based on said temperature.

8. The method of claim 7, including repeating at least said acquiring, obtaining, ascertaining, comparing, and determining at least 50,000 times per second.

9. The method of claim 1, wherein said predetermined setpoint is dependent on a temperature of said fiber optic transceiver.

10. The method of claim 1, further comprising, before said comparing:
    obtaining a temperature of said fiber optic transceiver;
    determining said predetermined setpoint based on said temperature, where said predetermined setpoint is a digital value representative of said predetermined setpoint; and
    converting said digital equivalent of said predetermined setpoint to said predetermined setpoint, where said predetermined setpoint is an analog value.

11. The method of claim 1, wherein said input signal is a laser bias current supplied to a laser within said fiber optic transceiver.

12. The method of claim 11, wherein there are at least eight setpoints associated with said laser bias current, where each of said eight setpoints is associated with a different operating temperature of said fiber optic transceiver.

13. The method of claim 1, wherein said input signal is selected from the group consisting of transmitter output power and received optical power.

14. The method of claim 13, wherein there are at least four setpoints associated with said transmitter output power or said received optical power, where each of said four setpoints is associated with a different operating temperature of said fiber optic transceiver.

15. The method of claim 1, wherein said determining further comprises ascertaining that said input signal is higher than said predetermined setpoint, and said generating occurs within 10 microseconds of said acquiring.

16. The method of claim 1, further comprising, prior to said comparing, converting said input signal from analog to digital.

17. The method of claim 16, wherein said determining further comprises ascertaining that a digital equivalent of said input signal is higher than said predetermined setpoint.

18. The method of claim 17, wherein said determining further comprises ascertaining that a digital equivalent of said input signal is lower than said predetermined setpoint.

19. The method of claim 1, wherein said generating occurs within 0.015 seconds of said acquiring.

20. The method of claim 1, wherein said predetermined setpoint is a high alarm setpoint, and said determining further comprises determining that said input signal is higher than said high alarm setpoint, thereby generating a high alarm flag.

21. The method of claim 1, wherein said predetermined setpoint is a high warning setpoint, and said determining further comprises determining that said input signal is higher than said high warning setpoint, thereby generating a high warning flag.

22. The method of claim 1, wherein said predetermined setpoint is a low warning setpoint, and said determining further comprises determining that said input signal is lower than said low warning setpoint, thereby generating a low warning flag.

23. The method of claim 1, wherein said predetermined setpoint is a low alarm setpoint, and said determining further comprises determining that said input signal is lower than said low alarm setpoint, thereby generating a low alarm flag.

24. The method of claim 1, wherein said input signal is selected from a group consisting of: a power supply voltage of said fiber optic transceiver, a temperature of said fiber optic transceiver, a laser bias current supplied to a laser within the fiber optic transceiver, optical power received by said fiber optic transceiver, transmitter output power as measured at said laser, and any combination of the aforementioned.

25. The method of claim 1, wherein said comparing comprises simultaneously:

firstly comparing a digital equivalent of said input signal to said predetermined setpoint; and secondly comparing said input signal to an analog equivalent of said predetermined setpoint, where said predetermined setpoint is digital and said input signal is analog.

26. The method of claim 25, further comprising, before said firstly comparing, converting said input signal from analog to digital.

27. The method of claim 25, further comprising, before said secondly comparing, converting said predetermined setpoint from digital to analog.

28. The method of claim 27, further comprising, before said converting:

obtaining a temperature of said fiber optic transceiver; and ascertaining said predetermined setpoint from multiple setpoints based on said temperature.

29. The method of claim 1, wherein said generating further comprises using a digital fault condition signal from a component within said fiber optic transceiver to shut down a laser within said fiber optic transceiver.

30. The method of claim 1, wherein the digital equivalent is a 16-bit number.

31. The method of claim 1, further comprising, prior to said comparing, converting said input signal from analog to digital, wherein the digital input signal is a 16-bit number.

32. A single-chip integrated circuit for preventing potentially unsafe operation of a fiber optic transceiver, comprising:

a memory, including one or more memory arrays, configured to store digital equivalents of predetermined setpoints;

communication circuitry configured to receive an input signal associated with operation of said fiber optic transceiver;

comparison logic configured to compare said input signal to at least one of said predetermined setpoints and to generate an alarm flag if said input signal conflicts with said setpoint, wherein the alarm flag is stored in a predefined location in the memory;

an interface for allowing a host to read from and write to host-specified locations within the memory, including the predefined location storing the alarm flag; and operation disable circuitry configured to disable operation of at least part of said fiber optic transceiver in response to a signal, wherein the signal is based on said alarm flag.

33. The single-chip integrated circuit of claim 32, further comprising conversion circuitry for converting the input signal from analog and digital, wherein the digital input signal is a 16-bit number.

34. The single-chip integrated circuit of claim 32, wherein the digital equivalents are 16-bit numbers.

35. The single-chip integrated circuit of claim 32, wherein the operation disable circuitry is responsive to a software operation.

36. The single-chip integrated circuit of claim 32, wherein the operation disable circuitry disables operation of the fiber optic transceiver in response to a signal sent to a disable pin in the fiber optic transceiver.

37. The single-chip integrated circuit of claim 32, wherein said predetermined setpoints are dependent on a temperature of said fiber optic transceiver.

38. The single-chip integrated circuit of claim 32, wherein the interface allows the host to read directly from and write directly to host-specified locations within the memory, including the predefined location storing the alarm flag.

39. A method for preventing potentially unsafe operation of a fiber optic transceiver, comprising:

in a memory within a fiber optic transceiver, storing a first set of digital equivalents of a plurality of predetermined setpoints for a bias current associated with a transmitter within the fiber optic transceiver, a second set of digital equivalents of a plurality of predetermined setpoints for an output power associated with the transmitter within the fiber optic transceiver, and a third set of digital equivalents of a plurality of predetermined setpoints for a received optical power associated with a receiver within the fiber optic transceiver;

acquiring, at an integrated circuit within said fiber optic transceiver, input signals associated with operation of said fiber optic transceiver, wherein the input signals include the bias current, the output power and the received optical power;

comparing the bias current to each digital equivalent in the first set of digital equivalents, the output power to each digital equivalent in the second set of digital equivalents and the received optical power to each digital equivalent in the third set of digital equivalents;

determining that said input signals conflict with at least one of the first set of digital equivalents, second set of digital equivalents and third set of digital equivalents, respectively; and generating an alarm flag based on said conflict.

40. The method of claim 39, wherein for each of the first, second and third sets, respectively, a first setpoint of said plurality of predetermined setpoints is a high alarm setpoint, and a second setpoint of said plurality of predetermined setpoints is a low alarm setpoint; and said determining further comprises determining whether said input signal is higher than said high alarm setpoint for the respective set, and determining whether said input signal is lower than said low alarm setpoint for the respective set.

41. The method of claim 40, wherein for each of the first, second and third sets, respectively, a third setpoint of said plurality of predetermined setpoints is a high warning setpoint, and a fourth setpoint of said plurality of predetermined setpoints is a low warning setpoint; and said determining further comprises determining whether said input signal is higher than said high warning setpoint for the respective set, and determining whether said input signal is lower than said low warning setpoint for the respective set.

42. The method of claim 41, wherein said generating includes, for each of the first, second and third sets, respectively, generating a high alarm flag when said input signal is higher than said high alarm setpoint, generating a high warning flag when said input is higher than said high warning setpoint, generating a low alarm flag when said input is lower than said low alarm setpoint, and generating a low warning flag when said input is lower than said low warning setpoint.

43. The method of claim 39, further comprising:

in a memory within a fiber optic transceiver, storing a fourth set of digital equivalents of a plurality of predetermined setpoints for a temperature associated with the fiber optic transceiver; and acquiring, at an integrated circuit within said fiber optic transceiver, the temperature;

wherein the comparing includes comparing the temperature with the fourth set of digital equivalents, and the determining includes determining whether the temperature conflicts with the fourth set of digital equivalents.

44. The method of claim 39, further comprising:

in a memory within a fiber optic transceiver, storing a fourth set of digital equivalents of a plurality of predetermined setpoints for a supply voltage associated with the fiber optic transceiver; and acquiring, at an integrated circuit within said fiber optic transceiver, the supply voltage;

wherein the comparing includes comparing the supply voltage with the fourth set of digital equivalents, and the determining includes determining whether the supply voltage conflicts with the fourth set of digital equivalents.

45. The method of claim 39, wherein:

the first set includes a high bias current setpoint and a low bias current setpoint, the second set includes a high output power setpoint and a low output power setpoint, and the third set includes a high received optical power setpoint and a low received optical power setpoint; the comparing includes comparing the bias current to the high bias current setpoint and the low bias current setpoint, comparing the out put power to the high output power setpoint and the low output power setpoint, and comparing the received optical power to the high received optical power setpoint and the low received optical power setpoint.

46. A method for preventing potentially unsafe operation of a fiber optic transceiver, comprising:

storing a digital equivalent of a predetermined low setpoint and a digital equivalent of a predetermined high setpoint in a memory within a fiber optic transceiver;

acquiring, at an integrated circuit within said fiber optic transceiver, an input signal associated with operation of said fiber optic transceiver;

comparing said input signal to the digital equivalent of the predetermined low setpoint and to the digital equivalent of the predetermined high setpoint;

determining that said input signal conflicts with either the digital equivalent of the predetermined low setpoint or the digital equivalent of the predetermined high setpoint;

generating an alarm flag based on said conflict;

storing said alarm flag in a predefined location within said memory; and enabling a host to read from host-specified locations within the memory, including the predefined location storing the alarm flag.

47. The method of claim 46, wherein the input signal includes any one of a transmitted power, a received optical power, a bias current, a temperature or a supply voltage associated with the fiber optic transceiver.

48. The method of claim 46, further comprising shutting down at least part of said fiber optic transceiver based on said alarm flag.

49. The method of claim 48, wherein shutting down includes disabling at least part of the fiber optic transceiver by a software operation.

50. The method of claim 48, wherein shutting down includes disabling at least part of the fiber optic transceiver by a signal sent to a disable pin in the fiber optic transceiver.

51. The method of claim 46, further comprising transmitting a warning to a host based on said alarm flag.

52. The method of claim 46, further comprising, before said comparing:

obtaining a temperature of said fiber optic transceiver; and ascertaining said predetermined setpoints from multiple setpoints based on said temperature.

53. The method of claim 46, wherein said predetermined setpoint is dependent on a temperature of said fiber optic transceiver.

54. The method of claim 46, wherein the digital equivalents are 16-bit numbers.

55. The method o claim 46, further comprising, prior to said comparing, converting said input signal from analog to digital, wherein the digital input signal is a 16-bit number.

56. A single-chip integrated circuit for preventing potentially unsafe operation of a fiber optic transceiver, comprising:
- a memory, including one or more memory arrays, configured to store a first set of digital equivalents of a plurality of predetermined setpoints for a bias current associated with a transmitter within the fiber optic transceiver, a second set of digital equivalents of a plurality of predetermined setpoints for an output power associated with the transmitter within the fiber optic transceiver, and a third set of digital equivalents of a plurality of predetermined setpoints for a received optical power associated with a receiver within the fiber optic transceiver;
- communication circuitry configured to receive input signals associated with operation of said fiber optic transceiver, wherein the input signals include the bias current, the output power and the received optical power; and
- comparison logic configured to compare the bias current to each digital equivalent in the first set of digital equivalents, the output power to each digital equivalent in the second set of digital equivalents and the received optical power to each digital equivalent in the third set of digital equivalents, and to generate an alarm flag if said input signals conflict with at least one of the first set of digital equivalents, second set of digital equivalents and third set of digital equivalents, respectively.

57. The single-chip integrated circuit of claim 56, further comprising:
- fault control circuitry configured to control operation of said fiber optic transceiver based on said alarm flag.

58. The single-chip integrated circuit of claim 57, further comprising conversion circuitry for converting between analog and digital.

59. The single-chip integrated circuit of claim 58, wherein said conversion circuitry is configured to convert said input signal from analog to digital using a predetermined calibration factor.

60. The single-chip integrated circuit of claim 58, wherein said conversion circuitry is configured to convert said at least one of said predetermined setpoints from digital to analog value.

61. The single-chip integrated circuit of claim 58, wherein said conversion circuitry is a digital comparator or an analog comparator.

62. The single-chip integrated circuit of claim 58, further comprising an internal transmitter disable connection for disabling at least a laser of said fiber optic transceiver based on said alarm flag.

63. The single-chip integrated circuit of claim 56, further comprising:
- operation disable circuitry configured to disable operation of said fiber optic transceiver in response to a signal, wherein the signal is based on said alarm flag.

64. Circuitry for monitoring operation of a fiber optic transceiver, comprising:
- a memory, including one or more memory arrays, configured to store a digital equivalent of a predetermined low setpoint and a digital equivalent of a predetermined high setpoint in a memory within a fiber optic transceiver;
- communication circuitry configured to receive an input signal associated with operation of said fiber optic transceiver;
- comparison logic configured to compare said input signal to the digital equivalent of the predetermined low setpoint and to the digital equivalent of the predetermined high setpoint, and to generate an alarm flag if said input signal conflicts with either the digital equivalent of the predetermined low setpoint or the digital equivalent of the predetermined high setpoint, wherein the alarm flag is stored in a predefined location in the memory; and
- an interface for allowing a host to read from host-specified locations including the predefined location storing the alarm flag.

65. The circuitry of claim 64, further comprising:
- operation disable circuitry configured to disable operation of said fiber optic transceiver in response to a signal, wherein the signal is based on said alarm flag.

66. The circuitry of claim 65, wherein the operation disable circuitry is responsive to a software operation.

67. The circuitry of claim 65, wherein the operation disable circuitry disables operation of the fiber optic transceiver in response to a signal sent to a disable pin in the fiber optic transceiver.

68. The circuitry of claim 64, further comprising conversion circuitry for converting the input signal from analog and digital, wherein the digital input signal is a 16-bit number.

69. The circuitry of claim 64, wherein the digital equivalents are 16-bit numbers.

70. The circuitry of claim 64, wherein said predetermined setpoints are dependent on a temperature of said fiber optic transceiver.

71. A method of monitoring operation of a fiber optic transceiver, comprising:
- storing a digital equivalent of a predetermined setpoint in a memory within a fiber optic transceiver;
- acquiring, at an integrated circuit within said fiber optic transceiver, an input signal associated with operation of said fiber optic transceiver;
- comparing said input signal to said predetermined setpoint;
- determining that said input signal conflicts with said setpoint;
- generating an alarm flag based on said conflict;
- storing the alarm flag at a predefined location within the memory; and
- enabling a host to read from and write to host-specified locations within the memory, and enabling the host to read from the predefined location storing the alarm flag.

72. The method of claim 71, including repeating at least said input signal acquiring, comparing and conflict determining at least 50 times per second.

73. The method of claim 71, further comprising shutting down at least part of said fiber optic transceiver based on said alarm flag.

74. The method of claim 71, further comprising transmitting a warning to a host based on said alarm flag.

75. The method of claim 71, further comprising, before said comparing:
- obtaining a temperature of said fiber optic transceiver; and
- ascertaining said predetermined setpoint from multiple setpoints based on said temperature.

76. The method of claim 75, including repeating at least said acquiring, obtaining, ascertaining, comparing, and determining at least 50,000 times per second.

77. The method of claim 71, wherein said predetermined setpoint is dependent on a temperature of said fiber optic transceiver.

78. The method of claim 71, further comprising, before said comparing:
- obtaining a temperature of said fiber optic transceiver;
- determining said predetermined setpoint based on said temperature, where said predetermined setpoint is a digital value representative of said predetermined setpoint; and
- converting said digital equivalent of said predetermined setpoint to said predetermined setpoint, where said predetermined setpoint is an analog value.

79. The method of claim 71, wherein said input signal is a laser bias current supplied to a laser within said fiber optic transceiver.

80. The method of claim 79, wherein there are at least eight setpoints associated with said laser bias current, where each of said eight setpoints is associated with a different operating temperature of said fiber optic transceiver.

81. The method of claim 71, wherein said input signal is selected from the group consisting of transmitter output power.

82. The method of claim 81, wherein there are at least four setpoints associated with said transmitter output power, where each of said four setpoints is associated with a different operating temperature of said fiber optic transceiver.

83. The method of claim 71, wherein said determining further comprises ascertaining that said input signal is higher than said predetermined setpoint, and said generating occurs within 10 microseconds of said acquiring.

84. The method of claim 71, further comprising, prior to said comparing, converting said input signal from analog to digital.

85. The method of claim 84, wherein said determining further comprises ascertaining that a digital equivalent of said input signal is higher than said predetermined setpoint.

86. The method of claim 85, wherein said determining further comprises ascertaining that a digital equivalent of said input signal is lower than said predetermined setpoint.

87. The method of claim 71, wherein said generating occurs within 0.015 seconds of said acquiring.

88. The method of claim 71, wherein said predetermined setpoint is a high alarm setpoint, and said determining further comprises determining that said input signal is higher than said high alarm setpoint, thereby generating a high alarm flag.

89. The method of claim 71, wherein said predetermined setpoint is a high warning setpoint, and said determining further comprises determining that said input signal is higher than said high warning setpoint, thereby generating a high warning flag.

90. The method of claim 71, wherein said predetermined setpoint is a low warning setpoint, and said determining further comprises determining that said input signal is lower than said low warning setpoint, thereby generating a low warning flag.

91. The method of claim 71, wherein said predetermined setpoint is a low alarm setpoint, and said determining further comprises determining that said input signal is lower than said low alarm setpoint, thereby generating a low alarm flag.

92. The method of claim 71, wherein said input signal is selected from a group consisting of: a power supply voltage of said fiber optic transceiver, a temperature of said fiber optic transceiver, a laser bias current supplied to a laser within the fiber optic transceiver, transmitter output power as measured at said laser, and any combination of the aforementioned.

93. The method of claim 71, wherein said comparing comprises simultaneously:
- firstly comparing a digital equivalent of said input signal to said predetermined setpoint; and
- secondly comparing said input signal to an analog equivalent of said predetermined setpoint, where said predetermined setpoint is digital and said input signal is analog.

94. The method of claim 93, further comprising, before said firstly comparing, converting said input signal from analog to digital.

95. The method of claim 93, further comprising, before said secondly comparing, converting said predetermined setpoint from digital to analog.

96. The method of claim 95, further comprising, before said converting:
- obtaining a temperature of said fiber optic transceiver; and
- ascertaining said predetermined setpoint from multiple setpoints based on said temperature.

97. The method of claim 71, wherein said generating further comprises using a digital fault condition signal from a component within said fiber optic transceiver to shut down a laser within said fiber optic transceiver.

98. The method of claim 71, wherein the digital equivalent is a 16-bit number.

99. The method of claim 71, further comprising, prior to said comparing, converting said input signal from analog to digital, wherein the digital input signal is a 16-bit number.

100. Circuitry for monitoring operation of a fiber optic transceiver, comprising:
- a memory, including one or more memory arrays, configured to store digital equivalents of predetermined setpoints;
- communication circuitry configured to receive an input signal associated with operation of said fiber optic transceiver;
- comparison logic configured to compare said input signal to at least one of said predetermined setpoints and to generate an alarm flag if said input signal conflicts with said setpoint, wherein the alarm flag is stored in a predefined location in the memory;
- an interface for allowing a host to read from and write to host-specified locations within the memory, and for enabling the host to read from the predefined location storing the alarm flag; and
- operation disable circuitry configured to disable operation of at least part of said fiber optic transceiver in response to a signal, wherein the signal is based on said alarm flag.

101. The circuitry of claim 100, further comprising conversion circuitry for converting the input signal from analog and digital, wherein the digital input signal is a 16-bit number.

102. The circuitry of claim 100, wherein the digital equivalents are 16-bit numbers.

103. The circuitry of claim 100, wherein the operation disable circuitry is responsive to a software operation.

104. The circuitry of claim 100, wherein the operation disable circuitry disables operation of the fiber optic transceiver in response to a signal sent to a disable pin in the fiber optic transceiver.

105. The circuitry of claim 100, wherein said predetermined setpoints are dependent on a temperature of said fiber optic transceiver.

106. The circuitry of claim 100, wherein the interface allows the host to read directly from and write directly to host-specified locations within the memory, and the predefined location storing the alarm flag.

* * * * *